United States Patent
Zurmoehle et al.

(10) Patent No.: US 11,036,364 B2
(45) Date of Patent: Jun. 15, 2021

(54) BROWSER FOR MIXED REALITY SYSTEMS

(71) Applicant: MAGIC LEAP, INC., Plantation, FL (US)

(72) Inventors: Tim Zurmoehle, Fort Lauderdale, FL (US); Andrea Isabel Montoya, Plantation, FL (US); Robert John Cummings MacDonald, White Rock, CA (US); Sakina Groth, Boca Raton, FL (US); Genevieve Mak, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/281,540

(22) Filed: Feb. 21, 2019

(65) Prior Publication Data

US 2019/0258365 A1 Aug. 22, 2019

Related U.S. Application Data

(60) Provisional application No. 62/634,016, filed on Feb. 22, 2018.

(51) Int. Cl.
*G06F 3/048* (2013.01)
*G06F 3/0483* (2013.01)
(Continued)

(52) U.S. Cl.
CPC ......... *G06F 3/0483* (2013.01); *G02B 27/017* (2013.01); *G06F 3/0482* (2013.01); *G06F 3/04845* (2013.01)

(58) Field of Classification Search
CPC ....... G06T 19/006; G06F 3/012; G06F 3/013; G06F 3/04815; G06F 3/0483;
(Continued)

(56) References Cited

U.S. PATENT DOCUMENTS 6,629,065 B1   9/2003   Gadh et al.
8,912,979 B1   12/2014  Gomez
(Continued)

FOREIGN PATENT DOCUMENTS

EP   1556805        8/2011
WO   WO 2017/062289  4/2017

OTHER PUBLICATIONS

PCT International Search Report and Written Opinion for International Appln. No. PCT/US2019/018932, Applicant Magic Leap, Inc., forms PCT/ISA/210, 220, and 237, dated May 14, 2019.
(Continued)

*Primary Examiner* — Alex Olshannikov
(74) *Attorney, Agent, or Firm* — Vista IP Law Group, LLP

(57) ABSTRACT

Disclosed is an improved systems and method for navigation and manipulation of browser windows in a 3D mixed reality environment. An improved approach is provided to view a user's windows, regardless of the current location for the user relative to one or more previously-opened windows. A method for displaying windows in a computing environment includes receiving an instruction to select multiple open windows. The method also includes retrieving information for the multiple open windows, where the multiple open windows are associated with different physical locations. The method further includes displaying a representation of the multiple open windows in a single user interface. Moreover, the method includes upon receiving a selection of a selected window of the multiple open windows, loading the selected window into a foreground of a field of view for a user.

21 Claims, 16 Drawing Sheets

(51) Int. Cl.
*G02B 27/01* (2006.01)
*G06F 3/0484* (2013.01)
*G06F 3/0482* (2013.01)

(58) Field of Classification Search
CPC .............. G06F 3/04845; G06F 3/0482; G02B 27/0172; G02B 27/017; G02B 2027/0123; G02B 2027/014
USPC ........................................................ 715/788
See application file for complete search history.

(56) References Cited

U.S. PATENT DOCUMENTS

| | | | |
|---|---|---|---|
| 8,924,862 B1* | 12/2014 | Luo ..................... | H04L 65/605 715/753 |
| 9,411,422 B1 | 8/2016 | McClendon et al. | |
| 9,671,566 B2 | 6/2017 | Abovitz et al. | |
| 9,761,055 B2 | 9/2017 | Miller | |
| 2002/0033845 A1 | 3/2002 | Elber et al. | |
| 2009/0089364 A1 | 4/2009 | Hamilton, II et al. | |
| 2012/0030617 A1* | 2/2012 | Louch .................... | G06F 9/451 715/802 |
| 2012/0131496 A1 | 5/2012 | Goossens et al. | |
| 2012/0179426 A1 | 7/2012 | Fontes et al. | |
| 2012/0212484 A1 | 8/2012 | Haddick et al. | |
| 2012/0249741 A1 | 10/2012 | Maciocci et al. | |
| 2012/0294539 A1 | 11/2012 | Lim et al. | |
| 2013/0342572 A1 | 12/2013 | Poulos et al. | |
| 2014/0002444 A1 | 1/2014 | Bennett et al. | |
| 2014/0118397 A1 | 5/2014 | Lee et al. | |
| 2014/0184496 A1 | 7/2014 | Gribetz et al. | |
| 2014/0225922 A1 | 8/2014 | Sbardella | |
| 2014/0232639 A1* | 8/2014 | Hayashi ................. | G06F 3/048 345/156 |
| 2014/0248950 A1 | 9/2014 | Tosas Bautista | |
| 2014/0267228 A1 | 9/2014 | Ofek et al. | |
| 2014/0306866 A1 | 10/2014 | Miller et al. | |
| 2014/0375683 A1* | 12/2014 | Salter ................. | G02B 27/0172 345/633 |
| 2015/0206343 A1 | 7/2015 | Mattila et al. | |
| 2015/0206349 A1 | 7/2015 | Rosenthal et al. | |
| 2015/0277699 A1 | 10/2015 | Algreatly | |
| 2015/0302651 A1 | 10/2015 | Shpigelman | |
| 2015/0317831 A1 | 11/2015 | Ebstyne et al. | |
| 2016/0026253 A1 | 1/2016 | Bradski et al. | |
| 2016/0027214 A1 | 1/2016 | Memmott et al. | |
| 2016/0048204 A1 | 2/2016 | Scott et al. | |
| 2016/0300392 A1 | 10/2016 | Jonczyk et al. | |
| 2017/0046881 A1 | 2/2017 | Kuribara | |
| 2017/0052994 A1* | 2/2017 | Jain ..................... | G06F 16/9562 |
| 2017/0054569 A1 | 2/2017 | Harms et al. | |
| 2017/0109936 A1 | 4/2017 | Powderly et al. | |
| 2017/0256096 A1* | 9/2017 | Faaborg ................ | G06T 19/20 |
| 2017/0287218 A1 | 10/2017 | Nuernberger et al. | |
| 2018/0004283 A1 | 1/2018 | Mathey-Owens et al. | |
| 2018/0005034 A1 | 1/2018 | Kaehler et al. | |
| 2018/0012330 A1 | 1/2018 | Holzer et al. | |
| 2018/0045963 A1 | 2/2018 | Hoover et al. | |
| 2018/0095276 A1 | 4/2018 | Ng-Thow-Hing | |
| 2018/0144111 A1 | 5/2018 | Katingari | |
| 2018/0150204 A1* | 5/2018 | Macgillivray ...... | G06F 3/04842 |
| 2018/0365897 A1 | 12/2018 | Pahud et al. | |
| 2019/0005724 A1 | 1/2019 | Pahud et al. | |
| 2019/0043259 A1 | 2/2019 | Wang et al. | |
| 2019/0079648 A1* | 3/2019 | Karunamuni ......... | G06F 3/0482 |

OTHER PUBLICATIONS

Notice of Allowance for U.S. Appl. No. 15/968,673 dated Jul. 15, 2020.
PCT Notification of the International Search Report and Written Opinion dated Jul. 11, 2018 for PCT Application No. PCT/US2018/030535, Applicant Magic Leap, Inc., 14 pages.
Extended European Search Report for EP Appln. No. 18794284.2 dated Jan. 29, 2020 (7 pages).
Foreign Response to 70(2) for EP Patent Appln. No. 18794284.2 dated Aug. 28, 2020.
Non-Final Office Action for U.S. Appl. No. 15/968,673 dated Oct. 17, 2019.
Final Office Action for U.S. Appl. No. 15/968,673 dated Mar. 30, 2020.
Amendment Response to Non-Final Office Action for U.S. Appl. No. 15/968,673 dated Jan. 17, 2020.
Amendment Response to Final Office Action for U.S. Appl. No. 15/968,673 dated Jun. 26, 2020.
Non-Final Office Action for U.S. Appl. No. 16/224,719 dated Feb. 6, 2020.
Final Office Action for U.S. Appl. No. 224,719 dated Jun. 18, 2020.
Amendment Response to Non-Final Office Action for U.S. Appl. No. 16/224,719 dated May 6, 2020.
IT Jungles, "iPhone—How to Move Re-arrange Home Screen Icons", Mar. 15, 2015, YouTube.com (Year: 2015).
PCT Invitation to Pay Additional Fees for International Patent Appln. No. PCT/US18/66331, Applicant Magic Leap Inc., form PCT/ISA/206, dated Mar. 13, 2019 (3 pages).
PCT International Search Report and Written Opinion for International Patent Appln. No. PCT/US18/66331, Applicant Magic Leap Inc., forms PCT/ISA/210, 220, and 237, dated May 8, 2019 (11 pages).
Amendment After Final for U.S. Appl. No. 16/224,719 dated Sep. 18, 2020.
Non-Final Office Actino for U.S. Appl. No. 16/224,719 dated Oct. 5, 2020.
Notice of Allowance for U.S. Appl. No. 15/968,673 dated Oct. 7, 2020.
Amendment Response to NFOA for U.S. Appl. No. 16/224,719 dated Jan. 5, 2021.
Notice of Allowance for U.S. Appl. No. 16/224,719 dated Jan. 27, 2021.
Extended European Search Report for EP Appln. No. 18891755.3 dated Dec. 23, 2020 (9 pages).
Dieter Schmal stieg et al: "The 1-13 Studierstube Augmented Reality Project—TR-186-2-00-22", Technical Reports of the Technical University of Vienna, Dec. 31, 2000 (Dec. 31, 2000), pp. 1-24, XP055270593, Retrieved from the Internet: URL:https://www.cg.tuwien.ac.at/research/publications/2000/Schm-2000-Stb/TR-186-2-00-22Paper.pdf.

* cited by examiner

| 510 Element ID | 520 Preference | 530 Parent Element ID | 540 Child Element ID | 550 Multiple Entity |
|---|---|---|---|---|
| 220 | Main | 260 | 230 | N |
| 230 | Horizontal | 220 | | Y |
| 240 | Vertical | | | Y |
| 250 | Secondary Tab | | 220 | Y |
| 260 | Main Tab | | | N |
| *** | | | | |

560 (brace under data rows)

500 (table reference)

*FIG. 5*

| Surface ID 710 | W 720 | H 730 | Orientation 740 | Real / Virtual 750 | 760 | Position (center of surface) 770 |
|---|---|---|---|---|---|---|
| 182 | 48 | 36 | Vertical | R | Multiple | (2.5, 2.3, 1.2)$_{user}$ |
| 192 | 24 | 24 | Horizontal | R | Single | (x, y, z)$_{user}$ |
| 186 | 24 | 36 | Vertical | R | Single | (1.3, 2.3, 1.3)$_{world}$ |
| 190 | 12 | 12 | Vertical | V | Single | (x, y, z)$_{182}$ |
| 194 | 16 | 16 | Horizontal | V | Multiple | (x, y, z)$_{frame}$ |
| *** | | | | | | |

| Element ID | Surface ID | * * * |
|---|---|---|
| 220 | 182 | |
| 230 | 192 | |
| 240 | 186 | |
| 250 | 190 | |
| * * * | | |

BROWSER FOR MIXED REALITY SYSTEMS

CROSS-REFERENCE TO RELATED APPLICATIONS

The present disclosure claims priority to U.S. Provisional Application No. 62/634,016, filed on Feb. 22, 2018, entitled "Browser for Mixed Reality Systems." The present disclosure is related to U.S. Provisional Application No. 62/492,292, filed on May 1, 2017, entitled "Spatially Deconstructed Browser." The contents of the aforementioned patent applications are hereby expressly and fully incorporated by reference in their entirety, as though set forth in full.

FIELD OF THE INVENTION

The disclosure relates to systems and methods for implementing browsing technology in a spatial 3D environment.

BACKGROUND

A typical way to view a web page is to open the web page on a monitor of a computer, smartphone, tablet, etc. A user would scroll through the web page to view the different content displayed on the web page. Normally, whether the user is looking at the computer monitor, smartphone or tablet, there is a fixed format as to how the content is displayed on the monitor.

With virtual reality, augmented reality, and/or mixed reality systems (hereinafter collectively referred to as "mixed reality" systems), a three dimensional environment is provided for the display of content to a user. The problem is that conventional approaches to display 2D content within browsers do not work very well when used in a 3D environment. One reason for this is because, with conventional 2D web browsers, the display area of the display device is limited to the screen area of a monitor that is displaying the content. As a result, conventional browsers are configured to only know how to organize and display content within that monitor display area. In contrast, 3D environments are not limited to the strict confines of the monitor display area. Therefore, conventional 2D browsers perform sub-optimally when used in a 3D environment since conventional browsing technologies just do not have the functionality or capability to take advantage of the 3D environment for displaying content.

For example, consider the situation when a user is using mixed reality equipment and has placed multiple browser windows that are associated with different physical locations. For instance, the user may have opened a first browser window in a first room and a second browser window while in a second room. Since conventional 2D-based browsers are limited to the display of a given monitor area, this means that conventional browsers do not even have technology to comprehend the idea of physically remote windows, much less the ability to handle this situation with multiple windows open in multiple physical locations, making it impossible for a user to effectively view, navigate to, and use these multiple windows.

Therefore, there is a need for an improved approach to implement browsing technology in a 3D environment.

SUMMARY

Improved systems and methods are provided for navigation and manipulation of browser windows in a 3D mixed reality environment. Some embodiments are directed to an improved approach to view a user's windows, regardless of the current location of the user relative to one or more previously-opened windows.

The improved systems and methods for navigation and manipulation of browser windows may be applied in the context of 2D content that is deconstructed and displayed in a spatially organized 3D environment. This may include identifying 2D content, identifying elements in the 2D content, identifying surrounding surfaces, mapping the identified elements to the identified surrounding surfaces, and displaying the elements as virtual content onto the surrounding surfaces.

In one embodiment, a method for displaying windows in a computing environment includes receiving an instruction to select multiple open windows. The method also includes retrieving information for the multiple open windows, where the multiple open windows are associated with different physical locations. The method further includes displaying a representation of the multiple open windows in a single user interface. Moreover, the method includes upon receiving a selection of a selected window of the multiple open windows, loading the selected window into a foreground of a field of view for a user.

In one or more embodiments, the representation of the multiple open windows is displayed in the single user interface by changing location parameters for multiple open windows to locations within a current physical environment for the user. The multiple open windows may be rendered and displayed to the user at coordinates that are assigned to the multiple open windows within the single user interface. The multiple open windows may be rendered in at least one of preview form, thumbnail form, or full form. All open windows may be selected for display in the single user interface. Each of the multiple open windows may be rendered into a separate prism for placement of virtual content. A window being hovered upon may move into a foreground while other windows may visually recede. Upon receiving the selection of the selected window, non-selected windows may be closed.

In another embodiment, a system for manipulating a window in a computing environment includes a mixed realty display device that displays three dimensional content. The system also includes a processor. The system further includes a memory for holding programmable code executable by the processor. The programmable code includes instructions to receive an instruction to select multiple open windows, retrieve information for the multiple open windows, where the multiple open windows are associated with different physical locations; displaying a representation of the multiple open windows in a single user interface in the mixed reality display device, and upon receiving a selection of a selected window of the multiple open windows, loading the selected window into a foreground of a field of view for a user.

In one or more embodiments, the representation of the multiple open windows is displayed in the single user interface by changing location parameters for multiple open windows to locations within a current physical environment for the user. The multiple open windows may be rendered and displayed to the user at coordinates that are assigned to the multiple open windows within the single user interface. The multiple open windows may be rendered in at least one of preview form, thumbnail form, or full form. All open windows may be selected for display in the single user interface. Each of the multiple open windows may be rendered into a bounded volume for placement of virtual content. A hover state may be implemented, where a window being hovered upon moves into a foreground while other windows visually recede. Upon receiving the selection of the selected window, non-selected windows may be closed.

In still another embodiment, a computer program product embodied on a computer readable medium, the computer readable medium having stored thereon a sequence of instructions which, when executed by a processor causes the processor to execute a method including receiving an instruction to select multiple open windows, retrieving information for the multiple open windows, where the multiple open windows are associated with different physical locations, displaying a representation of the multiple open windows in a single user interface, and upon receiving a selection of a selected window of the multiple open windows, loading the selected window into a foreground of a field of view for a user.

In one or more embodiments, the representation of the multiple open windows is displayed in the single user interface by changing location parameters for multiple open windows to locations within a current physical environment for the user. The multiple open windows may be rendered and displayed to the user at coordinates that are assigned to the multiple open windows within the single user interface. The multiple open windows may be rendered in at least one of preview form, thumbnail form, or full form. All open windows may be selected for display in the single user interface. Each of the multiple open windows may be rendered into a bounded volume for placement of virtual content. A hover state may be implemented, where a window being hovered upon moves into a foreground while other windows visually recede. Upon receiving the selection of the selected window, non-selected windows may be closed.

In yet another embodiment, a method for displaying virtual content in a computing environment includes receiving an instruction to select multiple open applications. The method also includes retrieving information for the multiple open applications, where the multiple open applications are associated with different physical locations. The method further includes displaying a representation of the multiple open applications in a single user interface. Moreover, the method includes upon receiving a selection of a selected application of the multiple open applications, loading the selected application into a foreground of a field of view for a user.

In one or more embodiments, the representation of the multiple open applications is displayed in the single user interface by changing location parameters for multiple open applications to locations within a current physical environment for the user. The multiple open applications may be rendered and displayed to the user at coordinates that are assigned to the multiple open applications within the single user interface. The multiple open applications may be rendered in at least one of preview form, thumbnail form, or full form. All open applications may be selected for display in the single user interface. Each of the multiple open applications may be rendered into a separate prism for placement of virtual content. A hover state may be implemented, where an application being hovered upon moves into a foreground while other applications visually recede. Upon receiving the selection of the selected application, non-selected applications may be closed.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIG. 5 shows an example of a table to store elements deconstructed from a 2D content, according to some embodiments.

FIG. 7 shows an example of a table to store an inventory of surfaces identified from a user's local environment, according to some embodiments.

DETAILED DESCRIPTION

Figure 1:
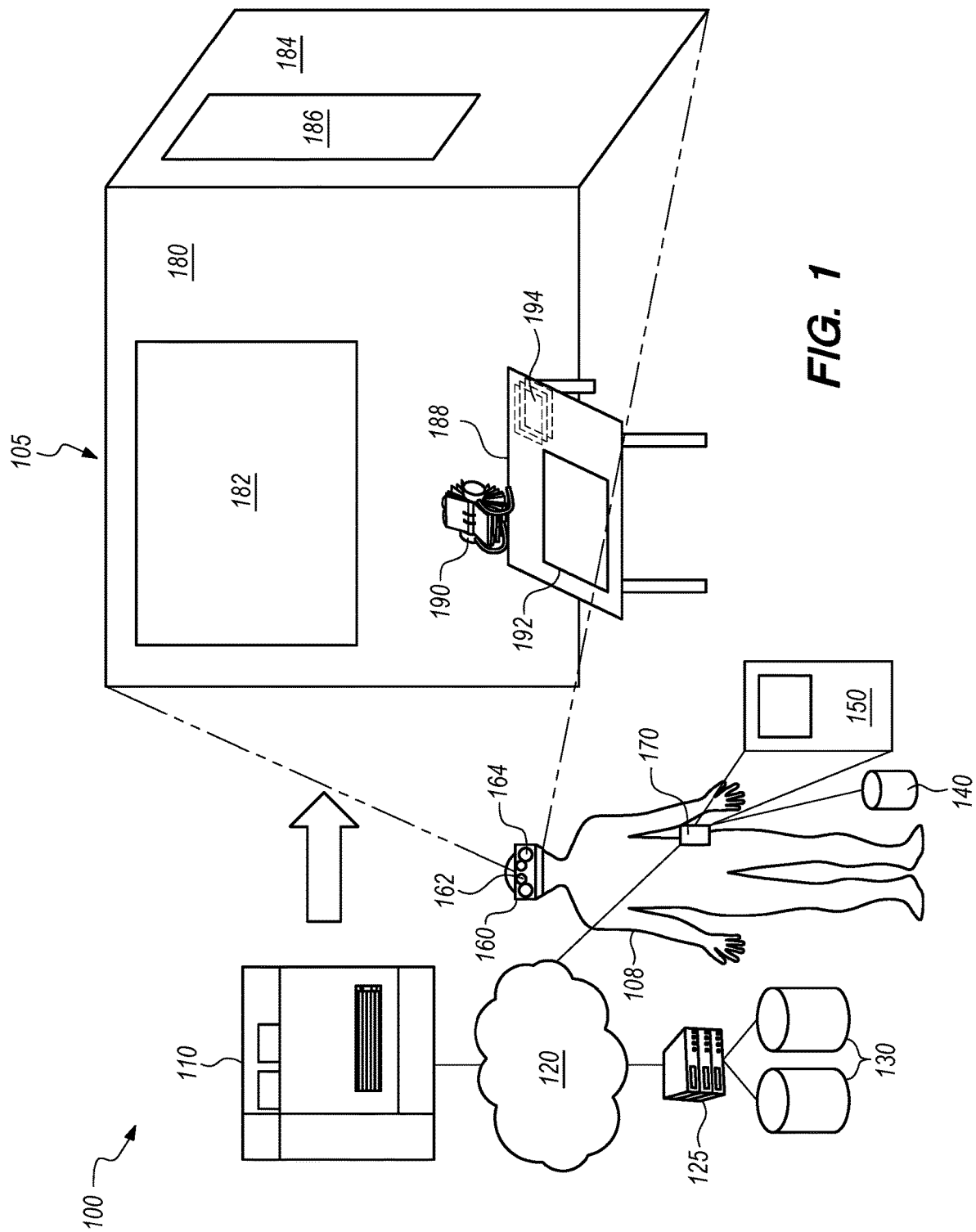
FIG. 1 illustrates an augmented reality environment for deconstructing 2D content to be displayed in a user's 3D environment, according to some embodiments.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Although the systems and methods as described below are primarily described within the context of browser applications, one of ordinary skill in the art would understand that the systems and methods described herein may also be applied within the context of one or more other applications as well. In some embodiments, an application for managing a user's photos and/or videos may utilize the systems and methods described below. In some embodiments, an application for playing card games may utilize the systems and methods described below. In some embodiments, a weather application may utilize the systems and methods described below. In some embodiments, any other application that may be installed and/or run on a device and/or system capable of displaying 3D virtual content to a user may utilize the systems and methods described below. In some embodiments, a single application may utilize the systems and methods described below. In some embodiments, more than one application may utilize the systems and methods described below. In some embodiments, all applications installed and/or run on the device and/or system capable of displaying 3D virtual content to a user may utilize the systems and methods described below. In some embodiments, multiple instances of an application may utilize the systems and methods described below.

Web Page Deconstruction

Embodiments of the disclosure will deconstruct a 2D web page to be displayed in a spatially organized 3D environment. The 2D web page may originate on a web browser of a head-mounted system, a mobile device (e.g., cell phone), a tablet, a television, an application, and the like. In some embodiments, the 2D web page may be received from another application or device such as a laptop computer, a desktop computer, an email application with a link to the 2D web page, an electronic message referencing or including a link to the 2D web page and the like.

Referring to Figure (FIG. 1, environment 100 is representative of a physical environment and systems for implementing processes described below (e.g., deconstructing 2D content from a web page to be displayed on 3D surfaces in a user's physical environment 105). The representative physical environment and system of the environment 100 includes a user's physical environment 105 as viewed by a user 108 through a head-mounted system 160. The representative system of the environment 100 further includes accessing a 2D content (e.g., a web page) via a web browser 110 operably coupled to a network 120. The network 120 may be the Internet, an internal network, a private cloud network, a public cloud network, etc. The web browser 110 is also operably coupled to a processor 170 via the network 120. Although the processor 170 is shown as an isolated component separate from the head-mounted system 160, in an alternate embodiment, the processor 170 may be integrated with one or more components of the head-mounted system 160, and/or may be integrated into other system components within the environment 100 such as, for example, the network 120 to access a computing network 125 and storage devices 130. The processor 170 may be configured with software 150 for receiving and processing information such as video, audio and content received from the head-mounted system 160, a local storage device 140, the web browser 110, the computing network 125, and the storage devices 130. The software 150 may communicate with the computing network 125 and the storage devices 130 via the network 120. The software 150 may be installed on the processor 170 or, in another embodiment; the features and functionalities of software may be integrated into the processor 170. The processor 170 may also be configured with the local storage device 140 for storing information used by the processor 170 for quick access without relying on information stored remotely on an external storage device from a vicinity of the user 108. In other embodiments, the processor 170 may be integrated within the head-mounted system 160.

The user's physical environment 105 is the physical surroundings of the user 108 as the user moves about and views the user's physical environment 105 through the head-mounted system 160. For example, referring to FIG. 1, the user's physical environment 105 shows a room with two walls (e.g., main wall 180 and side wall 184, the main wall and side wall being relative to the user's view) and a table 188. On the main wall 180, there is a rectangular surface 182 depicted by a solid black line to show a physical surface with a physical border (e.g., a painting hanging or attached to a wall or a window, etc.) that may be a candidate surface to project certain 2D content onto. On the side wall 184, there is a second rectangular surface 186 depicted by a solid black line to show a physical surface with a physical border (e.g., a painting hanging or attached to a wall or a window, etc). On the table 188, there may be different objects. 1) A virtual Rolodex 190 where certain 2D content may be stored and displayed; 2) a horizontal surface 192 depicted by a solid black line to represent a physical surface with a physical border to project certain 2D content onto; and 3) multiple stacks of virtual square surfaces 194 depicted by a dotted black line to represent, for example, stacked virtual newspaper where certain 2D content may be stored and displayed.

The web browser 110 may also display a blog page from the internet or within an intranet/private network. Additionally, the web browser 110 may also be any technology that displays digital 2D content. 2D content may include, for example, web pages, blogs, digital pictures, videos, news articles, newsletters, or music. The 2D content may be stored in the storage devices 130 that are accessible by the user 108 via the network 120. In some embodiments, 2D content may also be streaming content, for example, live video feeds or live audio feeds. The storage devices 130 may include, for example, a database, a file system, a persistent memory device, a flash drive, a cache, etc. In some embodiments, the web browser 110 containing 2D content (e.g., web page) is displayed via computing network 125.

The computing network 125 accesses the storage devices 130 to retrieve and store 2D content for displaying in a web page on the web browser 110. In some embodiments, the local storage device 140 may provide 2D content of interest to the user 108. The local storage device 140 may include, for example, a flash drive, a cache, a hard drive, a database, a file system, etc. Information stored in the local storage device 140 may include recently accessed 2D content or recently displayed content in a 3D space. The local storage device 140 allows improvements in performance to the systems of the environment 100 by providing certain content locally to the software 150 for helping to deconstruct 2D content to display the 2D content on the 3D space environment (e.g., 3D surfaces in the user's physical environment 105).

The software 150 includes software programs stored within a non-transitory computer readable medium to perform the functions of deconstructing 2D content to be displayed within the user's physical environment 105. The software 150 may run on the processor 170 wherein the processor 170 may be locally attached to the user 108, or in some other embodiments, the software 150 and the processor 170 may be included within the head-mounted system 160. In some embodiments, portions of the features and functions of the software 150 may be stored and executed on the computing network 125 remote from the user 108. For example, in some embodiments, deconstructing 2D content may take place on the computing network 125 and the results of the deconstructions may be stored within the storage devices 130, wherein the inventorying of a user's local environment's surfaces for presenting the deconstructed 2D content on may take place within the processor 170 wherein the inventory of surfaces and mappings are stored within the local storage device 140. In one embodiment, the processes of deconstructing 2D content, inventorying local surfaces, mapping the elements of the 2D content to local surfaces and displaying the elements of the 2D content may all take place locally within the processor 170 and the software 150.

The head-mounted system 160 may be a virtual reality (VR) or augmented reality (AR) head-mounted system that includes a user interface, a user-sensing system, an environment sensing system, and a processor (all not shown). The head-mounted system 160 presents to the user 108 an interface for interacting with and experiencing a digital world. Such interaction may involve the user and the digital world, one or more other users interfacing the environment 100, and objects within the digital and physical world.

The user interface may include receiving 2D content and selecting elements within the 2D content by user input through the user interface. The user interface may be at least one or a combination of a haptics interface devices, a keyboard, a mouse, a joystick, a motion capture controller, an optical tracking device and an audio input device. A haptics interface device is a device that allows a human to interact with a computer through bodily sensations and movements. Haptics refers to a type of human-computer interaction technology that encompasses tactile feedback or other bodily sensations to perform actions or processes on a computing device. In some embodiments, the control interface may be a user interface, such that the user may interact with the MR display system, for example by providing a user input to the system and the system responding by executing a corresponding command.

The user-sensing system may include one or more sensors 162 operable to detect certain features, characteristics, or information related to the user 108 wearing the head-mounted system 160. For example, in some embodiments, the sensors 162 may include a camera or optical detection/scanning circuitry capable of detecting real-time optical characteristics/measurements of the user 108 such as, for example, one or more of the following: pupil constriction/dilation, angular measurement/positioning of each pupil, spherocity, eye shape (as eye shape changes over time) and other anatomic data. This data may provide, or be used to calculate information (e.g., the user's visual focal point) that may be used by the head-mounted system 160 to enhance the user's viewing experience.

The environment-sensing system may include one or more sensors 164 for obtaining data from the user's physical environment 105. Objects or information detected by the sensors 164 may be provided as input to the head-mounted system 160. In some embodiments, this input may represent user interaction with the virtual world. For example, a user (e.g., the user 108) viewing a virtual keyboard on a desk (e.g., the table 188) may gesture with their fingers as if the user was typing on the virtual keyboard. The motion of the fingers moving may be captured by the sensors 164 and provided to the head-mounted system 160 as input, wherein the input may be used to change the virtual world or create new virtual objects.

The sensors 164 may include, for example, a generally outward-facing camera or a scanner for interpreting scene information, for example, through continuously and/or intermittently projected infrared structured light. The environment-sensing system may be used for mapping one or more elements of the user's physical environment 105 around the user 108 by detecting and registering the local environment, including static objects, dynamic objects, people, gestures and various lighting, atmospheric and acoustic conditions. Thus, in some embodiments, the environment-sensing system may include image-based 3D reconstruction software embedded in a local computing system (e.g., the processor 170) and operable to digitally reconstruct one or more objects or information detected by the sensors 164.

In one exemplary embodiment, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system may include other components other than those discussed above.

As mentioned above, the processor 170 may, in some embodiments, be integrated with other components of the head-mounted system 160, integrated with other components of system of the environment 100, or may be an isolated device (wearable or separate from the user 108) as shown in FIG. 1. The processor 170 may be connected to various components of the head-mounted system 160 through a physical, wired connection, or through a wireless connection such as, for example, mobile network connections (including cellular telephone and data networks), Wi-Fi, Bluetooth, or any other wireless connection protocol. The processor 170 may include a memory module, integrated and/or additional graphics processing unit, wireless and/or wired internet connectivity, and codec and/or firmware capable of transforming data from a source (e.g., the computing network 125, and the user-sensing system and the environment-sensing system from the head-mounted system 160) into image and audio data, wherein the images/video and audio may be presented to the user 108 via the user interface (not shown).

The processor 170 handles data processing for the various components of the head-mounted system 160 as well as data exchange between the head-mounted system 160 and 2D content from web pages displayed or accessed by web browser 110 and the computing network 125. For example, the processor 170 may be used to buffer and process data streaming between the user 108 and the computing network 125, thereby enabling a smooth, continuous and high fidelity user experience.

Deconstructing 2D content from a web page into elements and mapping the elements to be displayed on surfaces in a 3D environment may be accomplished in an intelligent and logical manner. A predetermined set of rules may be available to recommend, suggest, or dictate where to place certain types of elements/content identified within a 2D content/web page. For example, certain types of 2D content elements may have one or more content elements that may need to be mapped to a physical or virtual object surface amenable for storing and displaying the one or more elements while other types of 2D content elements may be a single object, such as a main video or main article within a web page, in which case, the single object may be mapped to a surface that makes the most sense to display a single object to the user.

Figure 2:
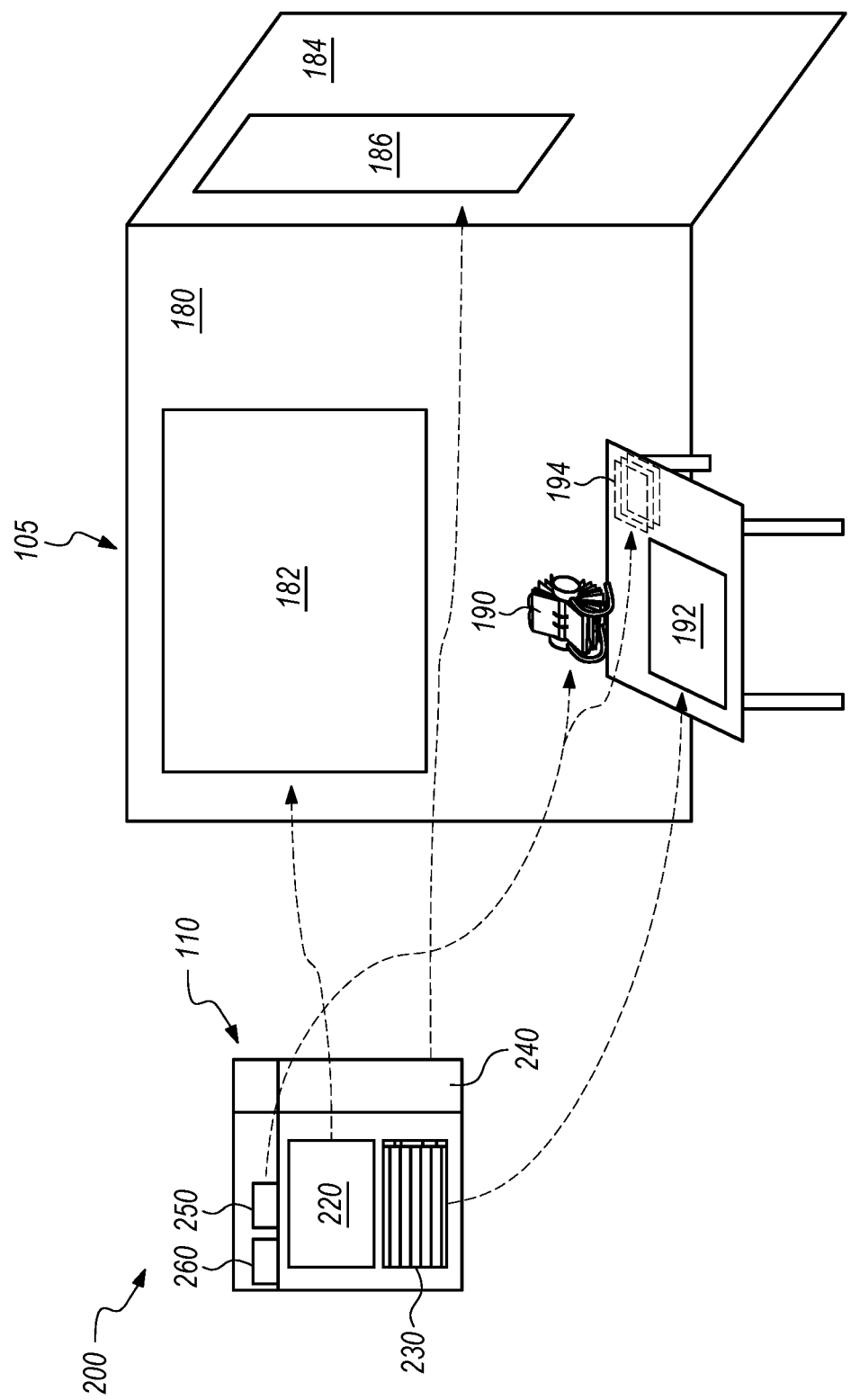
FIG. 2 illustrates an example mapping of elements of a 2D content to a user's 3D environment, according to some embodiments.

FIG. 2 illustrates an example mapping of elements of a 2D content to a user's 3D environment, according to some embodiments. Environment 200 depicts a 2D content (e.g., a web page) displayed or accessed by a web browser 110 and a user's physical environment 105. The dotted lines with an arrow head depict elements (e.g., particular types of content) from the 2D content (e.g., web page) that are mapped to and displayed upon the user's physical environment 105. Certain elements from the 2D content are mapped to certain physical or virtual objects in the user's physical environment 105 based on either web designer hints or pre-defined browser rules.

As an example, 2D content accessed or displayed by the web browser 110 may be a web page having multiple tabs, wherein a current active tab 260 is displayed and a secondary tab 250 is currently hidden until selected upon to display on the web browser 110. Displayed within the active tab 260 is typically a web page. In this particular example, the active tab 260 is displaying a YOUTUBE page including a main video 220, user comments 230, and suggested videos 240. As depicted in this exemplary FIG. 2, the main video 220 may be mapped to display on vertical surface 182, the user comments 230 may be mapped to display on horizontal surface 192, and suggested videos 240 may be mapped to display on a different vertical surface 186 from the vertical surface 182. Additionally, the secondary tab 250 may be mapped to display on a virtual Rolodex 190 and/or on a multi-stack virtual object 194. In some embodiments, specific content within the secondary tab 250 may be stored in the multi-stack virtual object 194. In other embodiments, the entire content residing within the secondary tab 250 may be stored and/or displayed on the multi-stack virtual object 194. Likewise, the virtual Rolodex 190 may contain specific content from the secondary tab 250 or the virtual Rolodex 190 may contain the entire content residing within the secondary tab 250.

The vertical surface 182 may be any type of structure which may already be on a main wall 180 of a room (depicted as the user's physical environment 105) such as a window pane or a picture frame. In some embodiments, the vertical surface 182 may be an empty wall where the head-mounted system 160 determines an optimal size of the frame of the vertical surface 182 that is appropriate for the user 108 to view the main video 220. This determination of the size of the vertical surface 182 may be based at least in part on the distance the user 108 is from the main wall 180, the size and dimension of the main video 220, the quality of the main video 220, the amount of uncovered wall space, and/or the pose of the user when looking at the main wall 180. For instance, if the quality of the main video 220 is of high definition, the size of the vertical surface 182 may be larger because the quality of the main video 220 will not be adversely affected by the vertical surface 182. However, if the video quality of the main video 220 is of poor quality, having a large vertical surface 182 may greatly hamper the video quality, in which case, the methods and systems of the present disclosure may resize/redefine the vertical surface 182 to be smaller to minimize poor video quality from pixilation.

The vertical surface 186, like the vertical surface 182, is a vertical surface on an adjacent wall (e.g., side wall 184) in the user's physical environment 105. In some embodiments, based on the orientation of the user 108, the side wall 184 and the vertical surface 186 may appear to be slanted surfaces on an incline. The slanted surfaces on an incline may be a type of orientation of surfaces in addition to vertical and horizontal surfaces. The suggested videos 240 from the YOUTUBE web page may be placed on the vertical surface 186 on the side wall 184 to allow the user 108 to be able to view suggested videos simply by moving the their head slightly to the right in this example.

The virtual Rolodex 190 is a virtual object created by the head-mounted system 160 and displayed to the user 108. The virtual Rolodex 190 may have the ability for the user 108 to bi-directionally cycle through a set of virtual pages. The virtual Rolodex 190 may contain entire web pages or it may contain individual articles or videos or audios. As shown in this example, the virtual Rolodex 190 may contain a portion of the content from the secondary tab 250 or in some embodiments, the virtual Rolodex 190 may contain the entire page of the secondary tab 250. The user 108 may bi-directionally cycle through content within the virtual Rolodex 190 by simply focusing on a particular tab within the virtual Rolodex 190 and the one or more sensors (e.g., the sensors 162) within the head-mounted system 160 will detect the eye focus of the user 108 and cycle through the tabs within the virtual Rolodex 190 accordingly to obtain relevant information for the user 108. In some embodiments, the user 108 may choose the relevant information from the virtual Rolodex 190 and instruct the head-mounted system 160 to display the relevant information onto either an available surrounding surface or on yet another virtual object such as a virtual display in close proximity to the user 108 (not shown).

The multi-stack virtual object 194, similar to virtual Rolodex 190, may contain content ranging from full contents from one or more tabs or particular contents from various web pages or tabs that the user 108 bookmarks, saves for future viewing, or has open (i.e., inactive tabs). The multi-stack virtual object 194 is also similar to a real-world stack of newspapers. Each stack within the multi-stack virtual object 194 may pertain to a particular newspaper article, page, magazine issue, recipe, etc. One of ordinary skill in the art may appreciate that there can be multiple types of virtual objects to accomplish this same purpose of providing a surface to place 2D content elements or content from a 2D content source.

One of ordinary skill in the art may appreciate that 2D content accessed or displayed by the web browser 110 may be more than just a web page. In some embodiments, 2D content may be pictures from a photo album, videos from movies, TV shows, YOUTUBE videos, interactive forms, etc. Yet in other embodiments, 2D content may be e-books, or any electronic means of displaying a book. Finally, in other embodiments, 2D content may be other types of content not yet described because 2D content is generally how information is presented currently. If an electronic device can consume a 2D content, then the 2D content can be used by the head-mounted system 160 to deconstruct and display the 2D content in a 3D setting (e.g., AR).

In some embodiments, mapping the accessed 2D content may include extracting the 2D content (e.g., from the browser) and putting it on a surface (such that the content is no longer in the browser and only on the surface), and in some embodiments, the mapping can include replicating content (e.g., from the browser) and putting it on a surface (such that the content is both in the browser and on the surface).

Deconstructing 2D content is a technical problem that exists in the realm of the Internet and computer-related technology. 2D content such as web pages are constructed using certain types of programming languages such as HTML to instruct computer processors and technical components where and how to display elements within the web pages on a screen for a user. As discussed above, a web designer typically works within the limitation of a 2D canvas (e.g., a screen) to place and display elements (e.g., content) within the 2D canvas. HTML tags are used to determine how an HTML document or portions within the HTML document are formatted. In some embodiments, the (extracted or replicated) 2D content can maintain the HTML tag reference, and in some embodiments, the HTML tag reference may be redefined.

Figure 3:
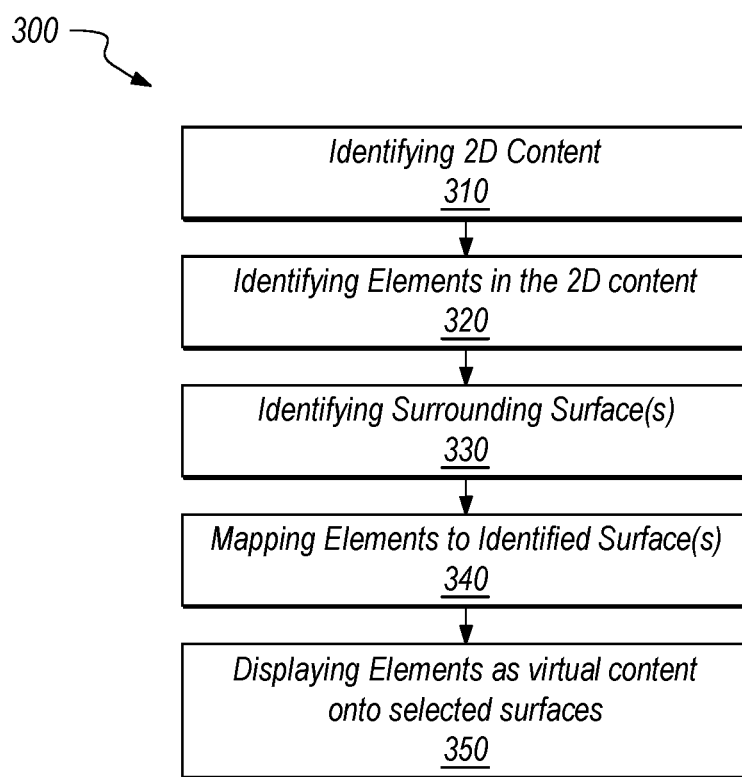
FIG. 3 is a flow diagram illustrating a method for deconstructing 2D content to be displayed in a 3D environment, according to some embodiments.

FIG. 3 is a flow diagram illustrating a method for deconstructing 2D content to be displayed in a 3D environment, according to some embodiments. The method includes identifying 2D content at 310, identifying elements in the 2D contents at 320, identifying surrounding surfaces at 330, mapping identified elements in the identified 2D contents to identified surfaces from the identifying surrounding surfaces at 340, and displaying elements as virtual content onto selected surfaces at 350, wherein the selected surfaces are selected from the mapping of the elements to the identified surfaces.

Identifying 2D content at 310 may involve the use of the head-mounted system 160 to search for digital content. Identifying 2D content at 310 may also include accessing digital content on servers (e.g., the storage devices 130) connected to the network 120. Identifying 2D content at 310 may include browsing the Internet for web pages that are of interest to the user 108. In some embodiments, identifying 2D content at 310 may include voice-activated commands given by the user 108 for searching content on the Internet. For example, a user 108 may be interacting with a device (e.g., head-mounted system 160) wherein the user 108 is searching for a particular video on the Internet by asking the device to search for the particular video by saying a command to search for a video and then saying the name of the video and a brief description of the video. The device may then search the Internet and pull up the video on a 2D browser to allow the user 108 to see the video as displayed on the 2D browser of the device. The user 108 may then confirm that the video is a video that the user 108 would like to view in the spatial 3D environment.

Once 2D content is identified, the method identifies elements in the 2D content at 320 to take inventory of the available elements within the 2D content for displaying to the user 108. The elements within the 2D content, for example, may include videos, articles and newsletters posted on a web page, comments and postings on a social media website, blog posts, pictures posted on various websites, audio books, etc. These elements within the 2D content (e.g., a web page) may contain HTML tags having attributes associated with HTML tags provided by a content designer to define where on the web page a particular element is placed and in some cases, when and how the element is to be displayed on the web page. In some embodiments, the methods and systems of the present disclosure will utilize these HTML tags and attributes as hints and suggestions provided by the content designer to aid in the mapping process at 340 to determine where and how to display the element in a 3D setting. For example, below is an example HTML Web Page code provided by the web page developer.

Example HTML Web Page Code Provided by a Web Page Developer

```
/*
measurement values can be given in cm since ml objects are meant to
work in the real world environment
type : hint for preference in surface type to match to;
priority : hint for preference in getting the desired surface during
matching, with range [1,100], where 1 is low priority and 100 is top
priority.
algorithm. higher value is higher priority (like z-index CSS property);
distance-depth: for the stack layout, distance between adjacent stacked
objects;
*/
<!DOCTYPE HTML>
<html>
<head> ... </head>
<body>
...
<ml-layout id="video" layout="plane" style="type:vertical;
priority:100;">
    <ml-container width="200cm" height="120cm">
        <div id="current_video" ... >
            <video ... >
            ...
            </video>
        </div>
    </ml-container>
</ml-layout>
<ml-layout id="recommendations" layout="stack" style="type:horizontal;
priority:90; distance-depth:20cm;">
    <ml-container width="50cm" height="50cm">
        <div id="video_recommendation_1">
        ...
        </div>
    </ml-container>
    <ml-container width="50cm" height="50cm">
        <div id="video_recommendation_2">
        ...
        </div>
    </ml-container>
</ml-layout>
...
</body>
</html>
```

The example HTML Web Page code provided by a web page developer includes a preference on how to display the main video on a web page, and a preference on how to display recommended (or suggested videos). In particular, this HTML web page code uses the tag of "style" to specify how to display the main video using a type value of "vertical" to designate a vertical surface to display the video. Additionally, within the "style" tag, additional hints provided by the web page developer may include a "priority" preference for a matching algorithm to use to prioritize which HTML element/content within the web page (e.g., the main video) should be mapped to which potential surface area. In the example HTML Web Page code, the priority was set at a value of 100 for the video having a vertical plane layout, wherein in this example, a higher priority value indicates a higher priority. Additionally, in this example, a preference is indicated by the web page developer to place the suggested videos in a stack having a type value of "horizontal" in a stack layout, wherein the distance between the stacked objects (e.g., in this case, a suggested video in relation to another suggested video) should be 20 cm.

Figure 4:
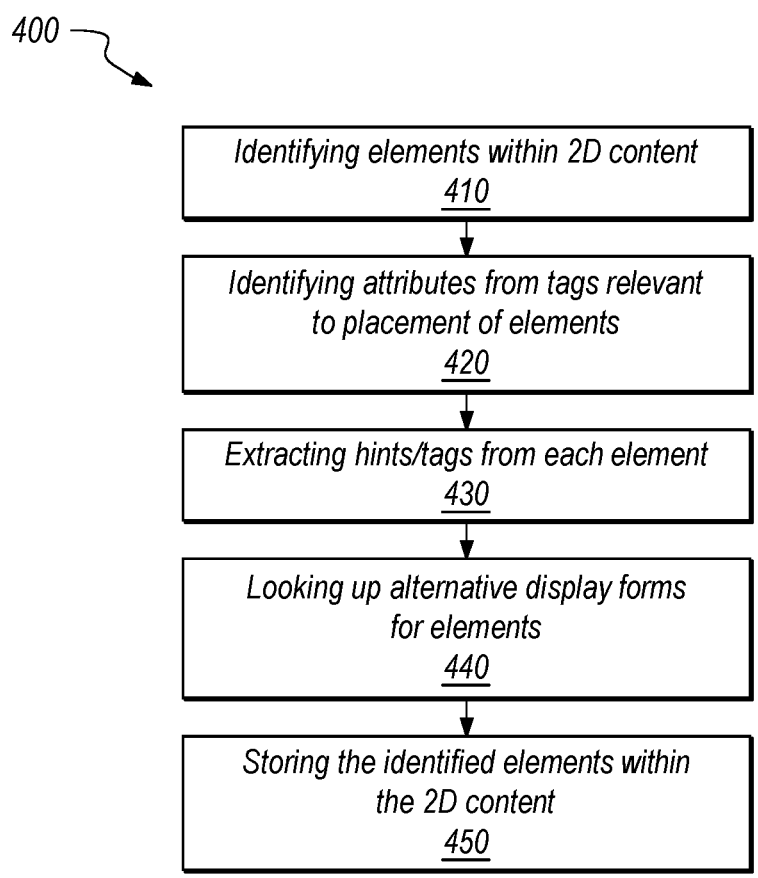
FIG. 4 is a flow diagram illustrating a method for identifying elements in a 2D content, according to some embodiments.

FIG. 4 is a flow diagram illustrating a method for identifying elements in a 2D content, according to some embodiments. FIG. 4 is a detailed flow disclosing identifying elements in the 2D content at 320 of FIG. 3, according to some embodiment. FIG. 4 begins with identifying elements within 2D content at 410, similar to identifying elements in the 2D content at 320 of FIG. 3. The method proceeds to the next step of identifying attributes from tags pertaining to placement of content at 420. As discussed above, a web page designer, while designing and configuring a web page, may associate elements within the web page to HTML tags to define where and how to display each element. These HTML tags may also include attributes pertaining to placement of the element onto a particular portion of the web page. It is these HTML tags and their attributes that the head-mounted system 160 will detect and coordinate with other components of the system to use as input as to where the particular element could be displayed.

Extracting hints or tags from each element is performed at 430. The hints or tags are typically formatting hints or formatting tags that are provided by the content designer of the 2D content/web page and/or a web page developer. As discussed above, the content designer may provide instructions or hints, for example, in the form of HTML tags as shown in the "Example HTML Web Page code provided by the web page developer", to instruct the web browser 110 to display the elements of a 2D content in a particular portion of the page or screen. In some embodiments, a web page designer may use additional HTML tag attributes to define additional formatting rules. For example, if the user has a reduced sensitivity to a specific color (e.g., red), do not display red and instead use another color, or as discussed above, if a video that had a preference to be displayed on a vertical surface cannot be displayed on a vertical surface, alternatively display the video on another (physical) surface or create a virtual surface and display the video on the virtual surface. Below is an example HTML Page parser implemented in a browser for parsing through an HTML page to extract hints/tags from each element within the HTML page. Example HTML Page Parser Implemented in a Browser

```
vector<WorldSurface> m_world_surfaces;
vector<MLLayout> m_layouts;
struct WorldSurface {
    // world position of the planar surface (x, y, z)
    vec3 position;
    // world orientation of the planar surface (x, y, z)
    vec3 rotation;
    // width and height of the planar surface
    float width;
    float height;
    // type = vertical, horizontal, inclined, etc.
    string type;
}
void PopulateWorldSurfaceList( ) {
    QueryWorldSurfacesFromEnvironment( );
    while (is_world_scan_in_progress) {
        WorldSurface surface;
        surface.width = CalculateLatestSurfaceSize( ).width( );
        surface.height = CalculateLatestSurfaceSize( ).height( );
        surface.position = CalculateLatestSurfaceTransform( ).pos( );
        surface.rotation = CalculateLatestSurfaceTransform( ).rot( );
        float distance_to_surface =
            (Camera( ).position - surface.position).distance( );
        vec3 gravity_direction = vec3(0, -1, 0); // always down
        vec3 surface_normal = CalculateLatestSurfaceNormal( );
        // determines surface type based on the angle between surface
        // normal and gravity vector
        surface.type = DetermineLatestSurfaceType(gravity,
            surface_normal);
        m_world_surfaces.push_back(surface);
    }
}
struct MLContainer {
    float width;
    float height;
}
struct MLLayout {
    // planar, list, grid, stack, etc.
    string layout;
    // hint used for matching algorithm
    int priority;
    // hint used for matching algorithm: vertical, horizontal
    string type;
    // any extra layout specific properties: e.g distance-depth
    string[ ] properties;
    // each layout consists of 1+ layout objects
    vector<MLContainer> objects;
}
void ParseHTMLDocumet(string url) {
    WebDocument document = LoadURL(url);
    Tag[ ] tags = document.ParseTags( );
    for (int i = 0; i < tags.size( ); i++) {
        if (tags[i].name == "ml-layout") {
            MLLayout ml_layout;
            ml_layout.layout = tags[i].propertyValue("layout");
            ml_layout.priority = tags[i].propertyValue("priority");
            ml_layout.type = tags[i].propertyValue("type");
            ml_layouts.push_back(ml_layout);
            while (tags[i].children( ) != NULL) {
                if (tags[i].GetNextChild( ).name == "ml-container") {
                    MLContainer ml_container;
                    ml_container.width =
                        tags[i].propertyValue("width");
                    ml_container.height =
                        tags[i].propertyValue("height");
                    ml_layout.objects.push_back(ml_container);
                }
            }
        }
    }
}
void main( ) {
    // url is loaded already into the page from user input
    string url = GetWebPageURL( );
    ParseHTMLDocument(url);
    // world is already being scanned while a device with sensors is
    running
    PopulateWorldSurfaceList( );
    DoMatchLayoutsToSurfaces(ml_layouts, m_world_surfaces);
}
```

The example HTML Page parser shows how an HTML page containing HTML tags used to provide display preferences for particular elements/objects within a 2D content (e.g., web page) can be parsed and identified and/or extracted/replicated. As disclosed in the example HTML Page parser, elements within a 2D content (e.g., a web page) can be parsed using the sample code disclosed. Certain HTML tags using various element names and values may be identified/extracted by the HTML Page parser (e.g., ML.layout, ML.container, etc.) to determine how the particular element is to be displayed to a user in a 3D environment (e.g., by mapping the element to a particular surface).

Looking up/searching alternative display forms for the one or more elements is performed at 440. Certain formatting rules may be specified for an image on a web page. For example, if the web browser 110 is capable of displaying a 3D version of the image, the web page designer may place an additional tag or define certain attributes of a particular tag to allow the web browser 110 to recognize that the image may have an alternative version of the image (e.g., a 3D version of the image). The web browser 110 may then access the alternative version of the image (e.g., the 3D version of the image) to be displayed in the 3D enabled browser.

Storing the identified elements within the 2D content is performed at 450. The method may store the identified elements into a non-transitory storage medium to be used by a mapping routine (e.g., mapping the elements to the identified surfaces at 340 of FIG. 3) to map the elements to particular surfaces. The non-transitory storage medium may include a data storage device such as the storage device 130 or the local storage device 140. The elements may be stored in a particular table such as the table disclosed in FIG. 5, described below. In some embodiments, the identified elements within the 2D content may be stored in a transitory storage medium.

FIG. 5 shows an example of a table to store elements deconstructed from a 2D content, according to some embodiments. Elements table 500 is an exemplary table that can store the results of the identifying elements within 2D content at 410 of FIG. 4 in a database. The elements table 500 includes, for example, information about the one or more elements within the 2D content including an element identification (ID) 510, a preference indicator 520 for where the element could be placed on a 3D surface, a parent element ID 530 if the particular element is included within a parent element, a child element ID 540 if the element may contain a child element, and a multiple entity indicator 550 to indicate whether the element contains multiple embodiments that may warrant the need to have the surface or virtual object that is used to display the element be compatible with displaying multiple versions of the elements. A parent element is an element/object within the 2D content that may contain sub-elements (e.g., child elements). For example, the Element ID having a value of 220 (e.g., main video 220) has a Parent Element ID value of 260 (e.g., active tab 260), which indicates that the main video 220 is a child element of the active tab 260. Or stated in a different way, the main video 220 is included within the active tab 260. Continuing with the same example, the main video 220 has a Child Element ID 230 (e.g., user comments 230) which indicates that the user comments 230 is associated with the main video 220. One of ordinary skill in the art may appreciate the elements table 500 may be a table in a relational database or in any type of database. Additionally, the elements table 500 may be an array in a computer memory (e.g., a cache) containing the results of the identifying elements within 2D content at 410 of FIG. 4.

Each row of rows 560 in the elements table 500 corresponds to an element from within a web page. The element ID 510 is a column containing a unique identifier for each element (e.g., an element ID). In some embodiments, an element's uniqueness may be defined as a combination of the element ID 510 column and another column within the table (e.g., the preference 520 column if there is more than one preference identified by the content designer). The preference 520 is a column whose value may be determined based at least in part on the HTML tags and attributes defined by the content designer/developer (e.g., a web page designer) and identified by the system and method as disclosed in extracting hints or tags from each element at 430 of FIG. 4. In other embodiments, the preference 520 column may be determined based at least in part on predefined browser rules to specify where certain types of elements within a web page should be displayed within a 3D environment. These predefined rules may provide suggestions to the systems and methods to determine where to best place the element in the 3D environment.

The parent element ID 530 is a column that contains the element ID of a parent element that this particular element in the current row is displayed within or is related to. A particular element within a web page may be embedded, placed within another element of the page, or related to another element on the page. For example, in the current embodiment, a first entry of the element ID 510 column stores a value of element ID 220 corresponding to the main video 220 of FIG. 2. A preference value in the preference 520 column corresponding to the main video 220 is determined based on the HTML tags and/or attributes and, in the current embodiment, is that this element should be placed in the "Main" location of a user's physical environment 105. Depending on the current location of the user 108, that main location may be a wall in a living room, or a stove top hood in a kitchen that the user 108 is currently looking at, or if in a wide-open space, may be a virtual object that is projected in front of the line of site of the user 108 that the main video 220 may be projected onto. More information on how the elements of 2D content are displayed to the user 108 will be disclosed in a later section. In continuing with the current example, the parent element ID 530 column stores a value of element ID 260 corresponding to the active tab 260 of FIG. 2. Therefore, the main video 220 is a child of the active tab 260.

The child element ID 540 is a column that contains the element ID of a child element that this particular element in the current row has displayed within or is related to. A particular element within a web page may be embedded, placed within another element of the page, or related to another element on the page. In continuing with the current example, the child element ID 540 column stores a value of element ID 230 corresponding to the user comments 230 of FIG. 2.

The multiple entity indicator 550 is a column that indicates whether the element contains multiple entities that may warrant the need to have the surface or virtual object that is used to display the element be compatible with displaying multiple versions of the elements (e.g., the element may be the user comments 230, wherein for the main video 220, there may be more than one comment available). In continuing with the current example, the multiple entity indicator 550 column stores a value of "N" to indicate that the main video 220 does not have or correspond to multiple main videos in the active tab 260 (e.g., "No" multiple versions of the main video 220).

In continuing with the current example, a second entry of the element ID 510 column stores a value of element ID 230 corresponding to the user comments 230 of FIG. 2. A preference value in the preference 520 column corresponding to the user comments 230 shows a preference of "Horizontal" to indicate that the user comments 230 should be placed on a "Horizontal" surface somewhere in the user's physical environment 105. As discussed above, the horizontal surface will be determined based on available horizontal surfaces in the user's physical environment 105. In some embodiments, the user's physical environment 105 may not have a horizontal surface, in which case, the systems and methods of the current disclosure may identify/create a virtual object with a horizontal surface to display the user comments 230. In continuing with the current example, the parent element ID 530 column stores a value element ID 220 corresponding to the main video 220 of FIG. 2, and the multiple entity indicator 550 column stores a value of "Y" to indicate that user comments 230 may contain more than one value (e.g., more than one user comment).

The remaining rows within the elements table 500 contain information for the remaining elements of interest to the user 108. One of ordinary skills in the art may appreciate that storing the results of the identifying elements within the 2D content at 410 improves the functioning of the computer itself because once this analysis has been performed on the 2D content, it may be retained by the system and method for future analysis of the 2D content if another user is interested in the same 2D content. The system and method for deconstructing this particular 2D content may be avoided since it has already been completed before.

In some embodiments, the element table 500 may be stored in the storage devices 130. In other embodiments, the element table 500 may be stored in the local storage device 140 for quick access to recently viewed 2D content or for possible revisit to the recently viewed 2D content. Yet in other embodiments, the element table 500 may be stored at both the storage devices 130 located remotely from the user 108 and the local storage device 140 located local to the user 108.

Returning to FIG. 3, the method continues with identifying surrounding surfaces at 330. The user 108 may view the user's physical environment 105 through the head-mounted system 160 to allow the head-mounted system 160 to capture and identify surrounding surfaces such as a wall, a table, a painting, a window frame, a stove, a refrigerator, a TV, etc. The head-mounted system 160 is aware of the real objects within the user's physical environment 105 because of the sensors and cameras on the head-mounted system 160 or with any other type of similar device. In some embodiments, the head-mounted system 160 may match the real objects observed within the user's physical environment 105 with virtual objects stored within the storage devices 130 or the local storage device 140 to identify surfaces available with such virtual objects. Real objects are the objects identified within the user's physical environment 105. Virtual objects are objects that are not physically present within the user's physical environment, but may be displayed to the user to appear as though the virtual objects are present in the user's physical environment. For example, the head-mounted system 160 may detect an image of a table within the user's physical environment 105. The table image may be reduced to a 3D point cloud object for quick and efficient comparison and matching at the storage devices 130 or the local storage device 140. If a match of the real object and a 3D point cloud object (e.g., of a table) is detected, the system and method will identify the table as having a horizontal surface because the 3D point cloud object representing a table is defined as having a horizontal surface. A more detailed description of the identifying surrounding surfaces is disclosed below in FIG. 6.

In some embodiments, the virtual objects may be extracted objects, wherein an extracted object may be a physical object identified within the user's physical environment 105, but is displayed to the user as a virtual object in the physical object's place so that additional processing and associations can be made to the extracted object that would not be able to be done on the physical object itself (e.g., to change the color of the physical object to highlight a particular feature of the physical object, etc.). Additionally, extracted objects may be virtual objects extracted from the 2D content (e.g., a web page from a browser) and displayed to the user 108. For example, a user 108 may choose an object such as a couch from a web page displayed on a 2D content/web page to be displayed within the user's physical environment 105. The system may recognize the chosen object (e.g., the couch) and display the extracted object (e.g., the couch) to the user 108 as if the extracted object (e.g., the couch) is physically present in the user's physical environment 105. Additionally, virtual objects may also include objects that have surfaces for displaying content (e.g., a transparent display screen in close proximity to the user for viewing certain content) that are not even in the physical presence of the user's physical environment 105, but from a displaying content from the 2D content perspective, may be an ideal display surface to present certain content to the user.

Figure 6:
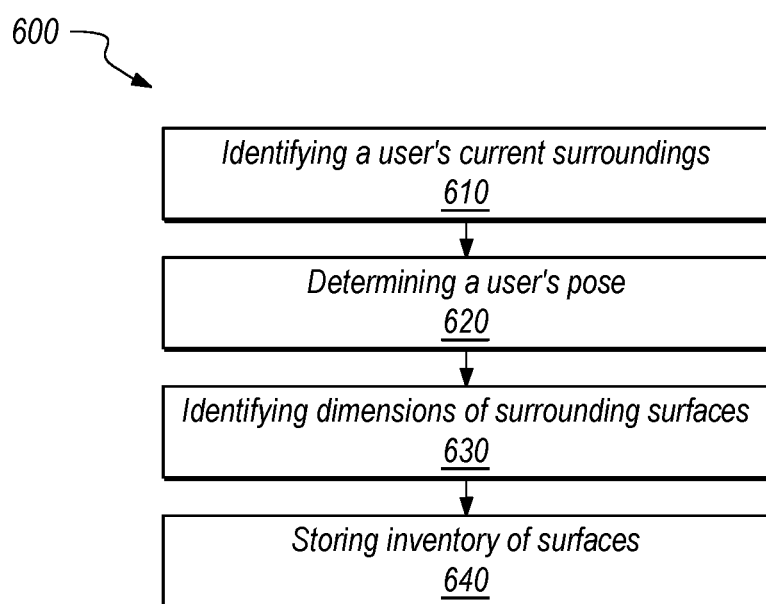
FIG. 6 is a flow diagram illustrating a method for identifying surfaces from a user's local environment, according to some embodiments.

FIG. 6 is a flow diagram illustrating a method for identifying surfaces from a user's local environment, according to some embodiments. FIG. 6 is a detailed flow disclosing the identifying surrounding surfaces at 330 of FIG. 3. FIG. 6 begins with identifying a user's current surroundings at 610, similar to identifying surrounding surfaces at 330 of FIG. 3. The method proceeds to the next step of determining a user's pose at 620.

Determining the user's pose at 620 is an important step to identifying a user's current surrounding because the user's pose will provide perspective for the user 108 in relation to the objects within the user's physical environment 105. For example, referring back to FIG. 1, the user 108, using the head-mounted system 160, is observing the user's physical environment 105. Determining the user's pose at 620 (i.e., vector and/or origin position information relative to the world) will help the head-mounted system 160 understand, for example, (1) how tall the user 108 is in relation to the ground, (2) the angle the user 108 has to rotate their head to move about and capture the images of the room, and (3) the distance between the user 108 to the table 188, the main wall 180 and the side wall 184. Additionally, the pose of the user 108 is also helpful to determine the angle of the head-mounted system 160 when observing vertical surfaces 182 and 186, along with other surfaces within user's physical environment 105.

At 630, the method identifies dimensions of the surrounding surfaces. Each candidate surface within the user's physical environment 105 is tagged and categorized with a corresponding dimension. In some embodiments, each candidate surface within the user's physical environment 105 is also tagged and categorized with a corresponding orientation. This information will be helpful to identify which element should map to which surfaces, based at least in part on the dimension of the surface, the orientation of the surface, the distance the user 108 is away from the particular surface, and type of information that needs to be displayed for the element. For example, a video can be shown further away than a blog or an article that may contain an abundance of information where the text size of the article may be too small for a user to see if displayed on a distant wall with small dimensions.

At 640, the method stores an inventory of the surrounding surfaces into a non-transitory storage medium to be used by a mapping routine (e.g., mapping the elements to the identified surfaces 340 of FIG. 3) to map the elements to particular surfaces. The non-transitory storage medium may include a data storage device such as the storage devices 130 or the local storage device 140. The identified surfaces may be stored in a particular table such as the table disclosed in FIG. 7 described below. In some embodiments, the identified surfaces may be stored in a transitory storage medium.

FIG. 7 shows an example of a table to store an inventory of surfaces identified from a user's local environment, according to some embodiments. Surfaces table 700 is an exemplary table that can store the results of the identifying surrounding surfaces process in a database. The surfaces table 700 includes, for example, information about surfaces within a user's physical environment 105 having data columns including surface ID 710, width 720, height 730, orientation 740, real or virtual indicator 750, multiple 760, and position 770. One of ordinary skill in the art may appreciate the surfaces table 700 may be a table in a relational database or in any type of database. Additionally, the surfaces table 700 may be an array in a computer memory (e.g., a cache) storing the results of the identifying surrounding surfaces at 330 of FIG. 3.

Each row of rows 780 in the surfaces table 700 may correspond to a surface from the user's physical environment 105 or a virtual surface that may be displayed to the user 108 within the user's physical environment 105. The surface ID 710 is a column containing a unique identifier to uniquely identify a particular surface (e.g., a surface ID). The dimensions of the particular surface are stored in the width 720 and height 730 columns.

The orientation 740 is a column indicating an orientation of the surface with respect to the user 108 (e.g., vertical, horizontal, etc.). The real/virtual 750 is a column indicating whether the particular surface is located on a real object within the user's physical environment 105 as perceived by the user 108 using the head-mounted system 160, or if the particular surface is located on a virtual object that will be generated by the head-mounted system 160 and displayed within the user's physical environment 105. The head-mounted system 160 may have to generate virtual objects for situations where the user's physical environment 105 may not contain enough surfaces to display an amount of content that the user 108 wishes to display. In these embodiments, the head-mounted system 160 may search from a database of existing virtual objects that may have appropriate surface dimensions to display certain types of elements identified for display. The database may be from the storage devices 130 or the local storage device 140.

The multiple 760 is a column indicating whether the surface/object is compatible with displaying multiple versions of an element (e.g., the element may be the secondary tab 250 of FIG. 2, wherein for a particular web browser 110, there may be more than one secondary (i.e., inactive) tab (e.g., one web page per tab). If the multiple 760 column has a value of "Multiple", such as the case for a fourth entry of the surface ID column storing a value of 190 corresponding to the virtual Rolodex 190 of FIG. 2, and a fifth entry of the surface ID column storing a value of 194 corresponding to the multi-stack virtual object 194 of FIG. 2), the system and method will know that if there is an element that may have multiple versions of the element, as is the case for inactive tabs, these are the types of surfaces that can accommodate the multiple versions.

The position 770 is a column indicating the position of the physical surface relative to a frame of reference or a reference point. The position of the physical surface may be pre-determined to be the center of the surface as shown in the column header of position 770 in FIG. 7. In other embodiments, the position may be pre-determined to be another reference point of the surface (e.g., the front, back, top or bottom of the surface). The position information may be represented as a vector and/or positional information from the center of the physical surface relative to some frame of reference or reference point. There may be several ways to represent position in the surface table 700. For example, the value of the position for surface ID 194 in surface table 700 is represented in the abstract to illustrate vector information and frame of reference information (e.g., the 'frame' subscript). The x,y,z are 3D coordinates in each spatial dimension and frame denotes which frame of reference the 3D coordinates are with respect to.

For example, surface ID 186 shows a position of the center of the surface 186 to be (1.3, 2.3, 1.3) with respect to a real world origin. As another example, surface ID 192 shows a position of the center of the surface 192 to be (x,y,z) with respect to a user frame of reference and surface ID 190 shows a position of the center of the surface 190 to be (x,y,z) with respect to another surface 182. The frame of reference is important to disambiguate which frame of reference is currently being used. In the case of a real world origin as the frame of reference, it is generally a static frame of reference. However, in other embodiments when the frame of reference is a user frame of reference, the user may be a moving reference frame, in which case, the plane (or vector information) may be moving and changing with the user if the user is moving and the user frame of reference is used as the frame of reference. In some embodiments, the frame of reference for each surface may be the same (e.g., user frame of reference). In other embodiments, the frame of reference for surfaces stored within a surface table 700 may be different, depending on surface (e.g., user frame of reference, world frame of reference, another surface or object in the room, etc.)

In the current example, the values stored within the surfaces table 700 contain physical surfaces (e.g., the vertical surfaces 182 and 186, and the horizontal surface 192) identified within the user's physical environment 105 of FIG. 2 and virtual surfaces (e.g., the virtual Rolodex 190 and the multi-stack virtual object 194). For example, in the current embodiment, a first entry of the surface ID 710 column stores a value of surface ID 182 corresponding to the vertical surface 182 of FIG. 2. A width value in the width 720 column and a height value in the height 730 column corresponding to the width and height of the vertical surface 182, respectively, indicate the vertical surface 182 has a dimension of 48" (W) by 36" (H). Similarly, an orientation value in the orientation 740 column indicates the vertical surface 182 has an orientation of "Vertical." Additionally, a real/virtual value in the real/virtual 750 column indicates the vertical surface 182 is a "R" (e.g., real) surface. A multiple value in the multiple 760 column indicates that vertical surface 182 is "Single" (e.g., can only hold a single content). Finally, a position 770 column indicates the position of the vertical surface 182 with respect to the user 108 with a vector information of $(2.5, 2.3, 1.2)_{user}$.

The remaining rows within the surfaces table 700 contain information for the remaining surfaces within the user's physical environment 105. One of ordinary skills in the art may appreciate that storing the results of the identifying surrounding surfaces at 330 of FIG. 3 improves the functioning of the computer itself because once this analysis has been performed on the surrounding surfaces, it may be retained by the head-mounted system 160 for future analysis of the user's surrounding surfaces if another user or the same user 108 is in the same physical environment 105 but interested in different 2D content. The processing steps for identifying surrounding surfaces at 330 may be avoided since these processing steps have already been completed before. The only differences may include identifying additional or different virtual objects to be available based at least in part on the elements table 500 identifying the elements with the different 2D content.

In some embodiments, the surfaces table 700 is stored in the storage devices 130. In other embodiments, the surfaces table 700 is stored in the local storage device 140 of the user 108 for quick access to recently viewed 2D content or for possible revisit to the recently viewed 2D content. Yet in other embodiments, the surfaces table 700 may be stored at both the storage devices 130 located remotely from the user 108 and the local storage device 140 located local to the user 108.

Figure 8:
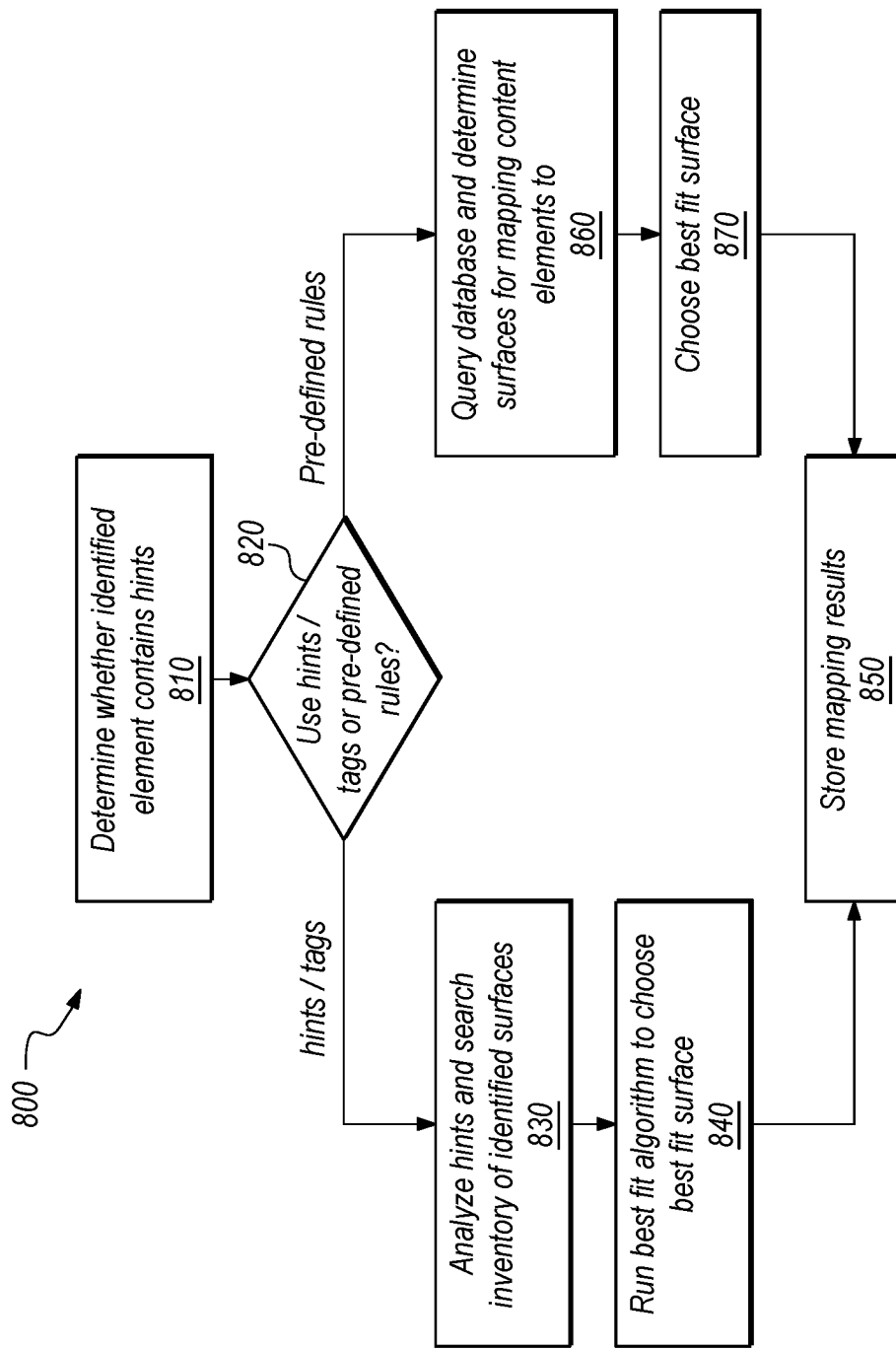
FIG. 8 is a flow diagram illustrating a method for mapping elements from a 2D content to available surfaces, according to some embodiments.

Returning to FIG. 3, the method continues with mapping elements to identified surfaces at 340 using a combination of the identified elements from the identifying elements in the 2D content 320 and the identified surrounding surfaces from the identifying surrounding surfaces at 330 and in some embodiments, using virtual objects as additional surfaces. Mapping the identified elements to the identified surfaces may involve multiple factors, some of which may include analyzing hints provided by a 2D content designer/author via HTML tag elements defined by the 2D content designer/author by using an HTML Page parser such as the example HTML Page parser discussed above. Other factors may include selecting from a pre-defined set of rules of how and where to map certain 2D content as provided by an AR browser, AR interface, and/or cloud storage. FIG. 8 provides a detailed flow of the mapping process of mapping one or more elements from the 2D content to identified surfaces.

FIG. 8 depicts a flow diagram illustrating a method for mapping elements from 2D content to surfaces, according to some embodiments. FIG. 8 is a detailed flow disclosing the mapping elements to identified surfaces at 340 of FIG. 3.

At 810, the method determines whether an identified element contains hints provided by the 2D content designer. The 2D content designer may provide hints as to where to best display a particular element when the 2D content designer originally designed the 2D content. For example, the main video 220 of FIG. 2 may be a YOUTUBE video displayed on a web page within the active tab 260. The 2D content designer (e.g., web page designer) may provide a hint to indicate that the main video 220 is best displayed on a flat vertical surface in the direct view of the user 108. In some embodiments, this may be accomplished by using existing HTML tag elements, originally designed for 2D web page content, to further define how a particular content element within the 2D content may be displayed if a 3D display environment is available. As another example, a 2D content designer may provide a hint that states that a 3D image is available instead of a 2D image for a particular web page. For example, in the case of the 2D image, the 2D content designer may, in addition to providing the basic HTML tags to identify the source of the 2D content, provide other infrequently used HTML tags to identify the source of a 3D version of the 2D image and in addition, provide a hint that if the 3D version of the image is used, to display it prominently in front of the user's view (e.g., in a main frame of a 3D layout). In some embodiments, the 2D content designer may provide this additional 'hint' to a 3D image location of the 2D image just in case the web browser 110 rendering the 2D content may have 3D displaying functionalities to leverage the enhanced 3D image. One skilled in the art may appreciate there are many other ways a 2D content designer may provide hints as to where a particular content element should be placed in a 2D layout other than what has been disclosed herein and that these are some examples of different ways a 2D content designer may provide hints to best display certain or all elements within a 2D content.

In another embodiment, the HTML tag standard may include new HTML tags or the creation of a similar mark-up language for providing hints of 3D object placement in a user's surrounding for AR/VR specific types of browsers such as the Example HTML Web Page provided by the web page developer discussed above. As of this writing, these new HTML tags have not yet been created and/or adopted as standard tags within the HTML language. However, once the HTML standard includes these types of additional tags, certain embodiments of the current methods and systems will leverage these new tags to further provide a mapping of the identified elements to identified surfaces. One skilled in the art may appreciate there are many other languages other than HTML tags that may be modified or adopted to further provide hints for how content elements should best be displayed in a 3D environment and that new HTML tagging standards is just one way to achieve such a goal.

At 820, the method determines whether to use hints provided by the 2D content designer or to use pre-defined sets of rules to map the one or more content elements from the 2D content to certain types of 3D surfaces. In some embodiments, where there are no hints provided by the 2D content designer for a particular content element, the system and method may determine, using the pre-defined sets of rules, the best way to map the content element to the surfaces. In other embodiments, even when there may be hints for placement of the content element provided by the 2D content designer, the system and method may also determine that it may be best to use the pre-defined sets of rules to map the content elements to the surfaces. However, in other embodiments, the system and method may determine that the hints provided by the 2D content designer are sufficient and thus use the hints to map the content elements to the surfaces. In the end, it is the ultimate decision of the AR browser that determines whether to use hints provided by the 2D content designer or to use pre-defined rules to map content elements to surfaces.

At 830, assuming it was determined that using the hints provided by the 2D content designer is the way to proceed, the method analyzes the hints and searches the inventory of identified surrounding surfaces that may be used to display the particular content element based at least in part on the hint (e.g., querying the surfaces table 700). At 840, the method runs a best-fit algorithm to choose a best-fit surface for the particular content element based on the provided hint. The best-fit algorithm, for example, may take a hint of "main content" for a particular content element within the particular web page and try to identify a 3D surface from among the available identified surrounding surfaces that is front and center with respect to the user 108 in the 3D environment. For example, the main video 220 of FIG. 2 is mapped to the vertical surface 182 because the main video 220 has a preference value of "Main" in the preference 520 column of the elements table 500 of FIG. 5 within the active tab 260 and the vertical surface 182 is the surface that is in the direct vision of the user 108 and has an optimal sized dimension to display a main video 220.

At 850, the method stores the mapping results for the content elements in a mapping of elements to surfaces table in a non-transitory storage medium to be used by a display algorithm to display the content elements onto their respectively mapped surfaces, whether the surfaces are the identified surrounding surfaces or virtual objects displayed in the user's surrounding environment. The non-transitory storage medium may include a data storage device such as the storage devices 130 or the local storage device 140. The mapping results may be stored in a particular table such as the table disclosed in FIG. 9, described below.

Figure 9:
FIG. 9 shows an example of a table to store the mapping of elements from a 2D content to surfaces from a user's local environment, according to some embodiments.

FIG. 9 shows an example of a table to store the mapping of content elements from a 2D content to surfaces, according to some embodiments. Mapping table 900 is an exemplary table that stores results of the content elements mapped to surfaces process into a database. The mapping table 900 includes, for example, information about the content element (e.g., element ID) and the surface that the content element is mapped to (e.g., surface ID). One of ordinary skill in the art may appreciate the mapping table 900 may be a table stored in a relational database or in any type of database or storage medium. Additionally, the mapping table 900 may be an array in a computer memory (e.g., a cache) containing the results of the mapping of elements to identified surrounding surfaces at 340 of FIG. 3.

Each row of the mapping table 900 corresponds to a content element from the 2D content mapped to a surface either in the user's physical environment 105 or a virtual object that is displayed to the user 108, wherein the virtual object appears to be an object in the user's physical environment 105. For example, in the current embodiment, a first entry of the element ID column stores a value of element ID 220 corresponding to the main video 220. A surface ID value in the surface ID column corresponding to the main video 220 is 182 corresponding to the vertical surface 182. In this manner, the main video 220 is mapped to the vertical surface 182 Similarly, the user comments 230 are mapped to the horizontal surface 192, the suggested videos 240 are mapped to the vertical surface 186, and the secondary tab 250 is mapped to the virtual Rolodex 190. The element IDs in the mapping table 900 may be associated to element IDs stored in the elements table 500 of FIG. 5. The surface IDs in the mapping table 900 may be associated to surface IDs stored in the surfaces table 700 of FIG. 7.

Returning to FIG. 8, at 860, assuming it was determined that using the predefined rules is the way to proceed, the method queries a database containing mapping rules of content elements to surfaces and determines for a particular content element within a web page, which types of surfaces should be considered for mapping the content element. For example, the rules returned for the main video 220 from FIG. 2 may indicate that main video 220 should be mapped to vertical surfaces, and thus after searching the surfaces table 700, multiple candidate surfaces are revealed (e.g., the vertical surfaces 182 and 186, and the virtual Rolodex 190). At 870, the pre-defined sets of rules may run a best-fit algorithm to choose from the available candidate surfaces, which surface is the best fit for this main video 220. Based at least in part on the best-fit algorithm, it is determined that the main video 220 should be mapped to the vertical surface 182 because of all of the candidate surfaces, the vertical surface 182 is a surface that is in the direct line of sight of the user 108 and the vertical surface 182 has the best dimension for displaying a video. Once the mapping of the one or more elements is determined, at 850 the method stores the mapping results for the content elements in a mapping of elements to surfaces table in a non-transitory storage medium as described above.

Returning to FIG. 3, the method continues with displaying the one or more elements as virtual content onto mapped surfaces at 350. The head-mounted system 160 may include one or more display devices within the head-mounted system 160 such as mini projectors (not shown) to display information. The one or more elements are displayed onto the respective mapped surfaces as mapped at 340. Using the head-mounted system 160, the user 108 will see the content on the respective mapped surfaces. One of ordinary skill in the art may appreciate the content elements are displayed to appear to be physically attached on the various surfaces (physical or virtual) but in actuality, the content elements are actually projected onto the physical surfaces as perceived by the user 108 and in the cases of virtual objects, the virtual objects are displayed to appear to be attached on the respective surfaces of the virtual objects. One of ordinarily skill in the art may appreciate that when the user 108 turns their head or looks up or down, the display devices within the head-mounted system 160 may continue to keep the content elements affixed to their respective surfaces to further provide the perception to the user 108 that the content are affixed to the mapped surfaces. In other embodiments, the user 108 may change the content of the user's physical environment 105 by a motion made by head, hands, eyes or voice of the user 108.

Improved Browser/Application Implementations

In mixed reality systems, a user's workspace is not limited by the size of a display screen. Therefore, unlike conventional browsers, the browser window in a mixed reality system can be placed and retained anywhere within the user's environment. The problem is that conventional browser technologies are configured with the assumption that a displayable browser location must be limited to the confines of a display screen.

The following portion of the disclosure is directed to an improved approach to view windows in a mixed reality environment. Using mixed reality equipment, it is possible that a user may have multiple browser windows that are associated with and placed in the user's physical space. For example, the user may open a first browser window in a first room and a second browser window while in a second room. The issue addressed by this portion of the disclosure pertains to the situation where a browser window is opened in a manner such that it is anchored to a position in a first location, such that the browser window is no longer visible when the user goes to a second location. The problem is that, as a user changes environments (such as moving between rooms or going to a different geographical location), the user may nonetheless still need access to his/her previous sessions in a prior geographical location.

Figure 10:
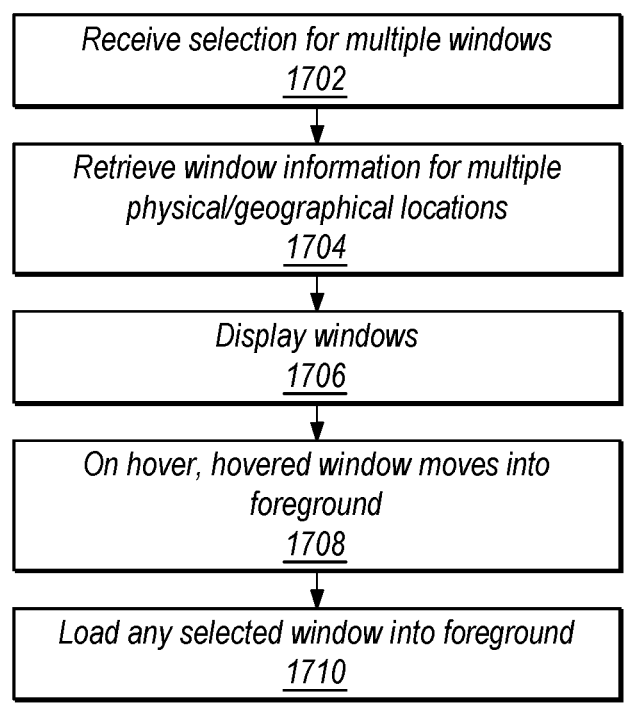
FIG. 10 illustrates a flowchart of an approach to implement viewing of a user's windows.

FIG. 10 illustrates a flowchart of an approach to implement viewing of a user's windows, regardless of the current location for the user relative to the location(s) of one or more previously-opened windows. In some embodiments, a control interface is provided to select for display of all and/or multiple windows associated with the user. In some embodiments, the control interface may be a user interface, such that the user may interact with the MR display system, for example by providing a user input to the system and the system responding by executing a corresponding command. In some embodiments, the user may interact with visual, audio, tactile, or other aspects of the MR system. In some embodiments, the user interface may comprise a browser hub, which in some embodiments may be a visual representation of one or more aspects of one or more browser application(s). For example, an "All Windows" icon can be presented within the browser hub, where selection of the "All Windows" icon initiates display of the multiple windows associated with the user, regardless of the location of the user relative to the current window locations (e.g. where the windows were opened). FIG. 10 starts at step 1702, when the system receives a command to display all or multiple windows (1702). In some embodiments, step 1702 may occur when the user selects an all windows icon, which may be within a browser hub user interface. In some embodiments, the system receives a selection for more than one window. In some embodiments, the system may receive a user input indicating the user would like to view more than one window associated with the user's system.

At 1704, information is retrieved for the multiple windows that are associated with the user. In some embodiments, the user may have one or more windows associated with the user. The windows for which information is gathered may be located in disparate physical locations. In accordance with some embodiments, instead of managing browser windows in a VR/AR environment on a one-on-one basis independently by each application, the window may be instead rendered into a bounded volume hereinafter may be referred to as a "Prism." Each Prism may have characteristics and properties that allow a universe application to manage and display the Prism in the VR/AR environment such that a universe application may manage the placement and display of the virtual content in the VR/AR environment by managing the Prism itself. Further details regarding an approach to implement prisms is described in U.S. Application Ser. No. 62/610,101, entitled "METHODS AND SYSTEM FOR MANAGING AND DISPLAYING VIRTUAL CONTENT IN AN AUGMENTED REALITY SYSTEM", filed on Dec. 22, 2017, which is hereby incorporated by reference in its entirety. The information about the windows may be gathered by accessing the database of prisms that are associated with the user, where prisms may be displaying one or more windows at specified locations.

Figure 12:
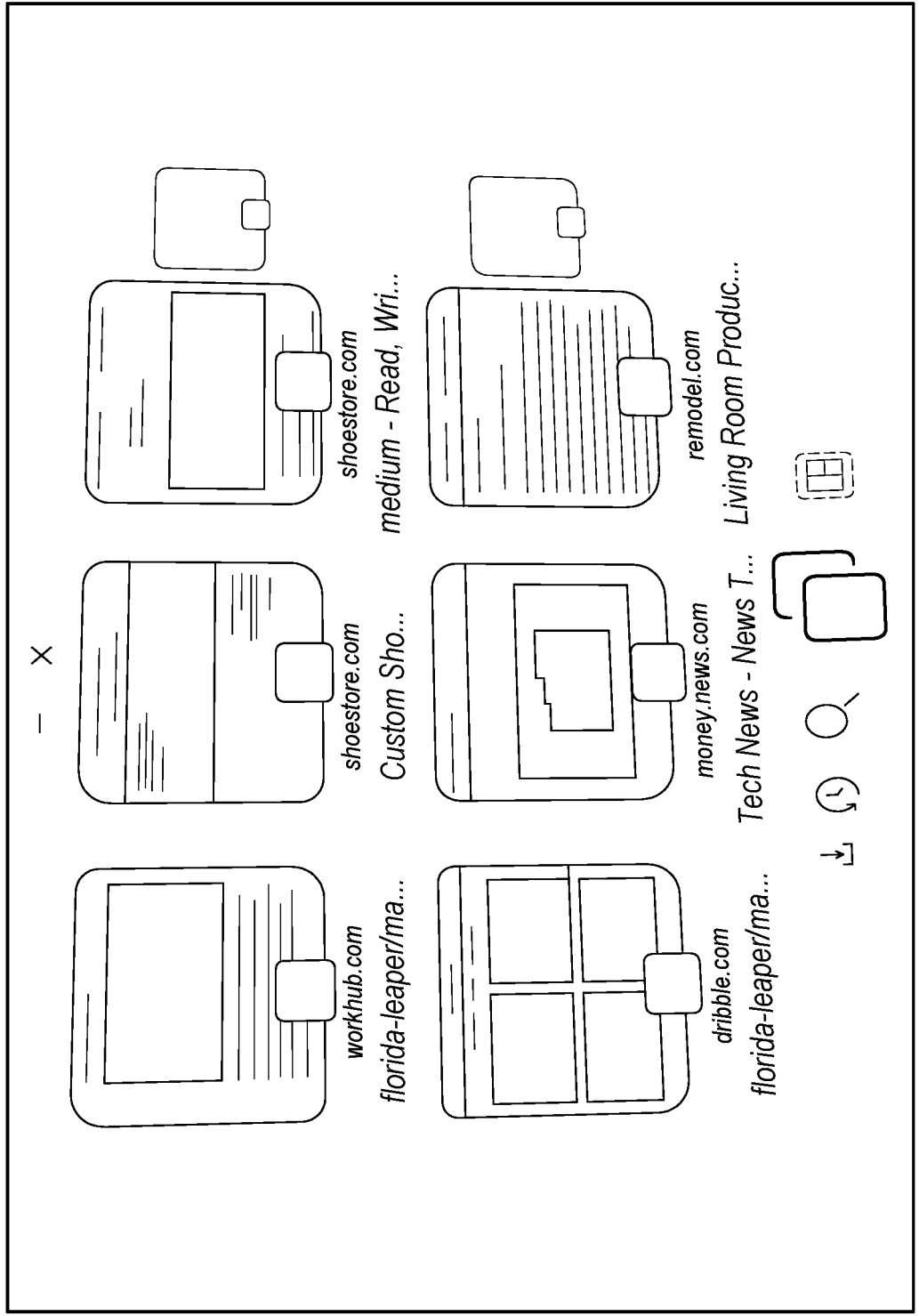
FIGS. 12-13 provide illustrations of possible approaches to display the multiple windows within a mixed realty interface.
Figure 13:
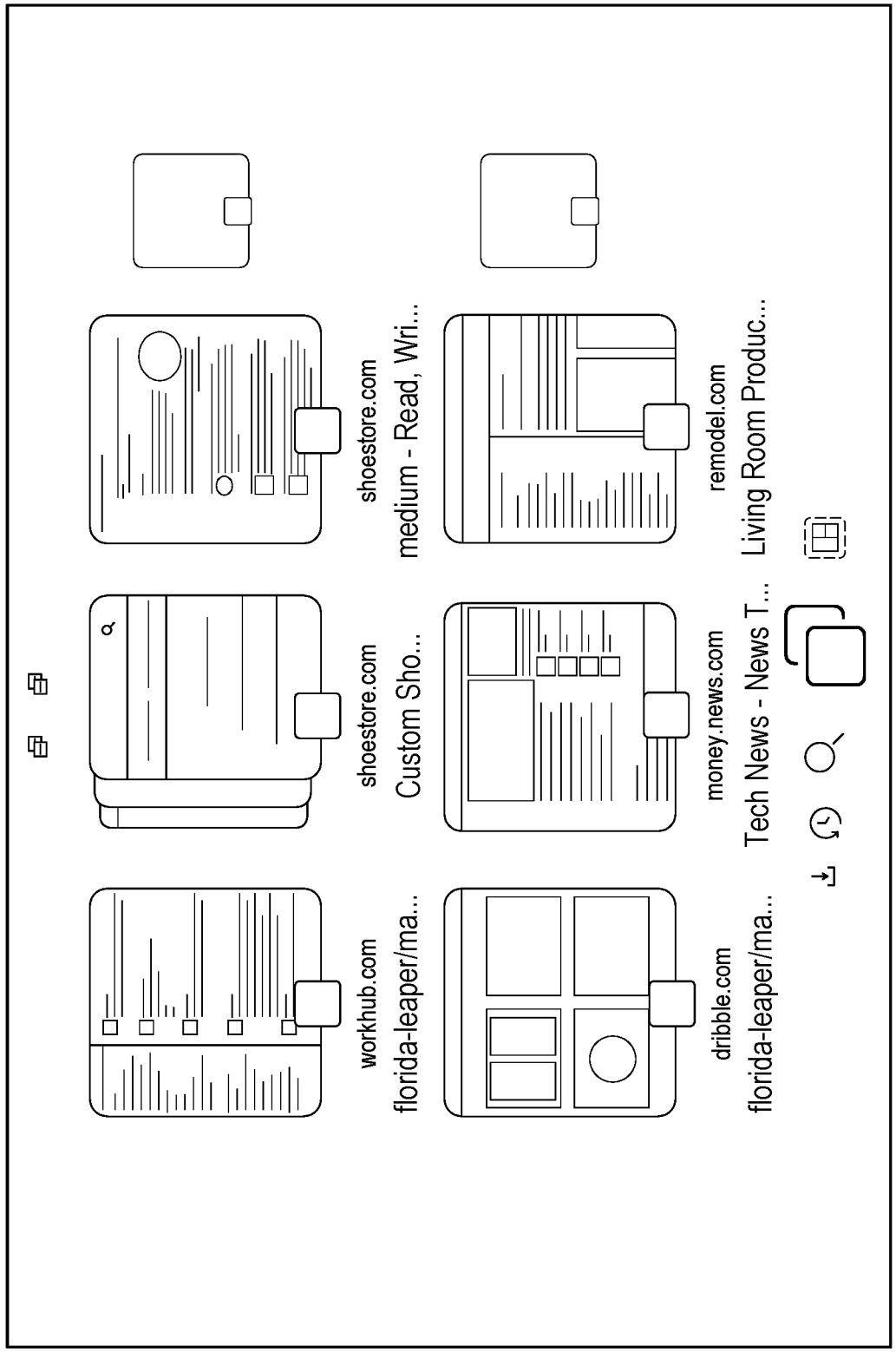
Figure 14:
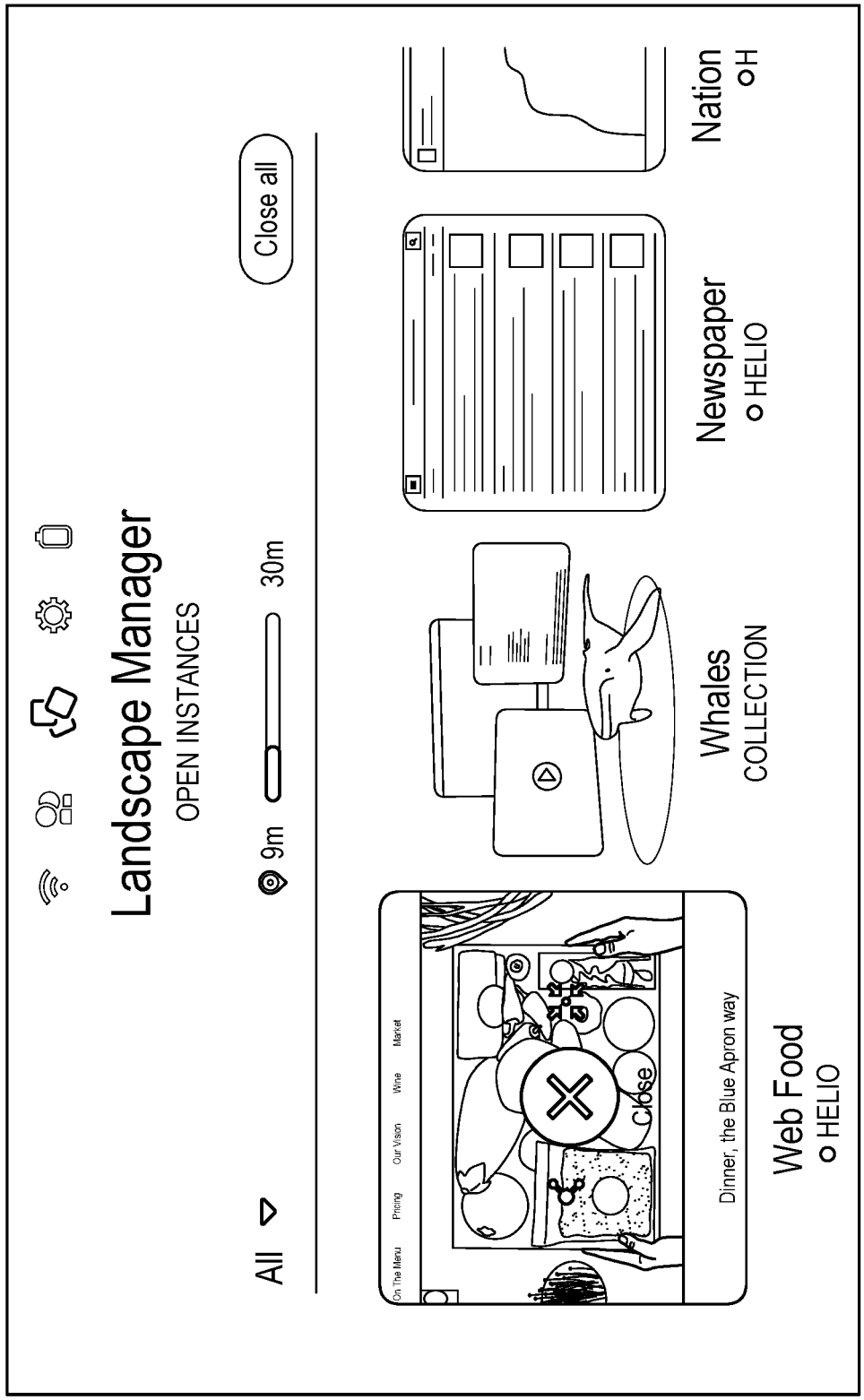
FIG. 14 illustrates a possible approach to displaying multiple prisms within a mixed reality system.

In some embodiments, an "All Windows" view is loaded, showing all open windows and tabbed windows, each represented by a preview, favicon, domain name and/or page title, or any other suitable visual representation of the window (1706). In some embodiments, an example of an open window includes a window actively being interacted with by one or more users. Other examples include a placed application/window/browser, whether it has an open/active status, paused status, stopped status, closed status, etc. In addition, so long as an instance of the application exists/is placed and has one or more tabs with content, then in some embodiments it can be accessed remotely using the current inventive approaches. As an additional example, an open window may correspond to some or all prisms associated with a given application (e.g., browser) regardless of its status (active, paused, closed, etc.), which can be accessed remotely through the "All Windows" view in the current embodiment. In some embodiments, the "All Windows" view may comprise all browser windows that are contained within one or more prisms at one or more physical location in the real world. Examples of "All Windows" and an analogous "All Applications" views are shown in FIGS. 12-14 and described below. Although "All Windows" is used as an example, any other single application could be used instead. Although "All Applications" is used as an example, any subset of all the applications may be used instead.

The various windows that were identified in step 1704 can be displayed in this manner in the user's current location. This may be accomplished by changing the location parameters for the identified windows to locations within the user's current physical environment, in effect summoning the window to the user. In some embodiments, this may be accomplished by creating a copy of the window information and instead associating a new location with the information, for example a location at or near the user's current location. The windows are then rendered (in preview form, thumbnail form, and/or full form) and displayed to the user at the coordinates that are assigned to the respective windows and/or the window's prism.

At 1708, which is optional in this method, a hover state may be identified and be acted upon with respect to one or more windows. For example, on hover, the window being hovered upon may move into the foreground, and the other windows may optionally recede slightly. Windows with multiple tabs may expand slightly to show the background tabs. In some embodiments, instead of a window, the hovered upon object may be any visual representation of the browser window, such as a preview, full screen, or shrunken screen. At 1710, the user selects one or more of the windows. In some embodiments, the user may select the window(s) by clicking a button on a controller (e.g. totem), or by performing a specific gesture, or by looking at the window for a predetermined period of time. If the user selects the window, a duplicate of the original window is loaded in the foreground of the user's FOV and the All Windows view closes. In some embodiments, the duplicate either updates the original, the duplicate updates all or some additional copies, and/or the duplicate is independent from the original, depending on user selected preference. In some embodiments, the content loaded in the foreground corresponds to an existing prism that is moved (e.g., unpinned and moved in its entirety). In some embodiments, the content loaded in the foreground corresponds to an existing prism that is duplicated, with new associated location information. If the user activates the context menu, the user may be presented with a user menu comprising options for closing the window, adding it to a collection, and/or minimizing the window. The context menu may be a user interface with predetermined user interface options that tell the system to execute specific functions when selected. In some embodiments, the context menu may be activated by a force press to the center of a touchpad on a totem while hovering over a selectable object, such as a window. In some embodiments, the context window may be analogous to a right click on a desktop computer, in that the action enables the user to perform an action on the selected object, such as move, close, etc.

Figure 11A:
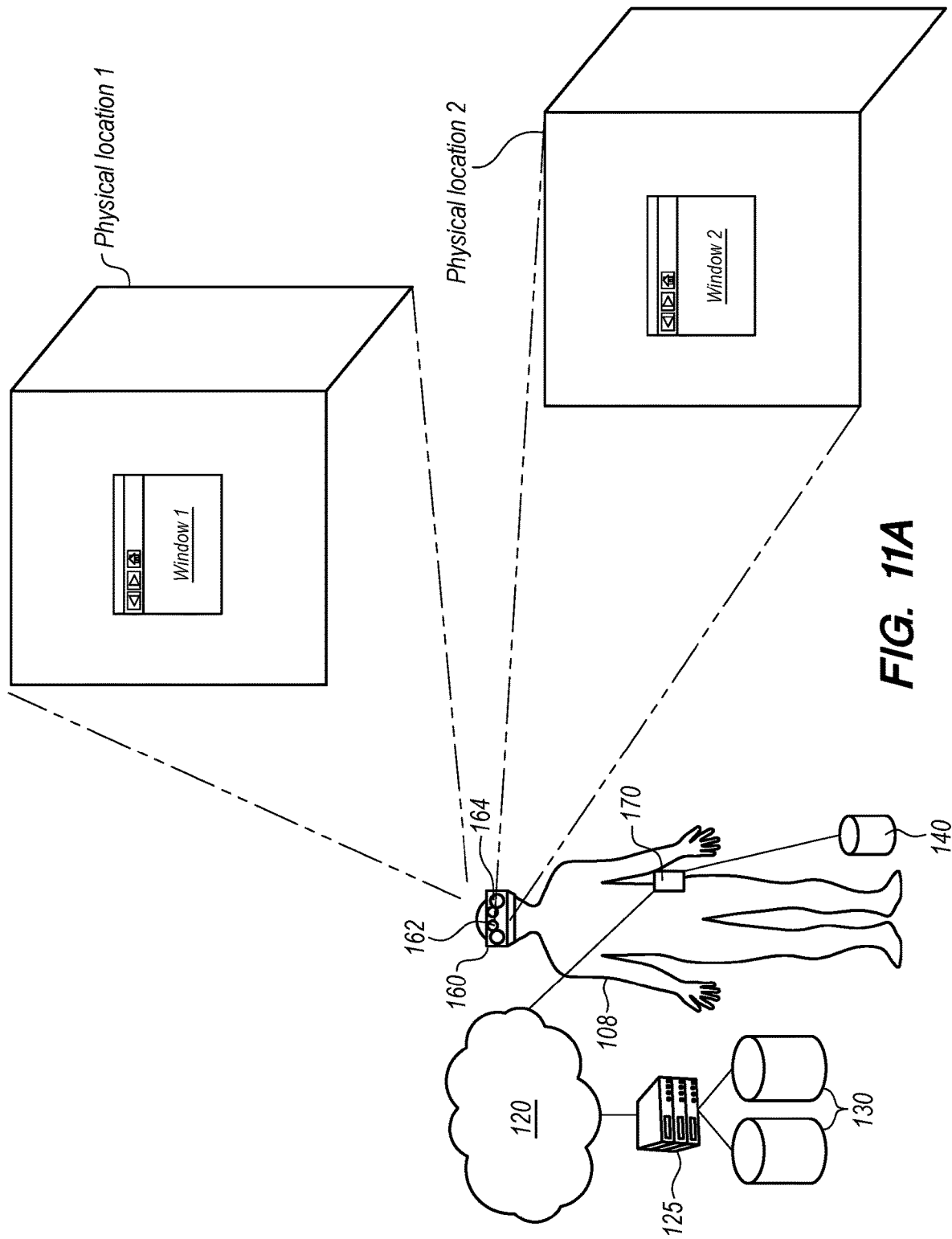
FIGS. 11A-B illustrate a process to display windows for the user regardless of the previously physical location of the windows.
Figure 11B:
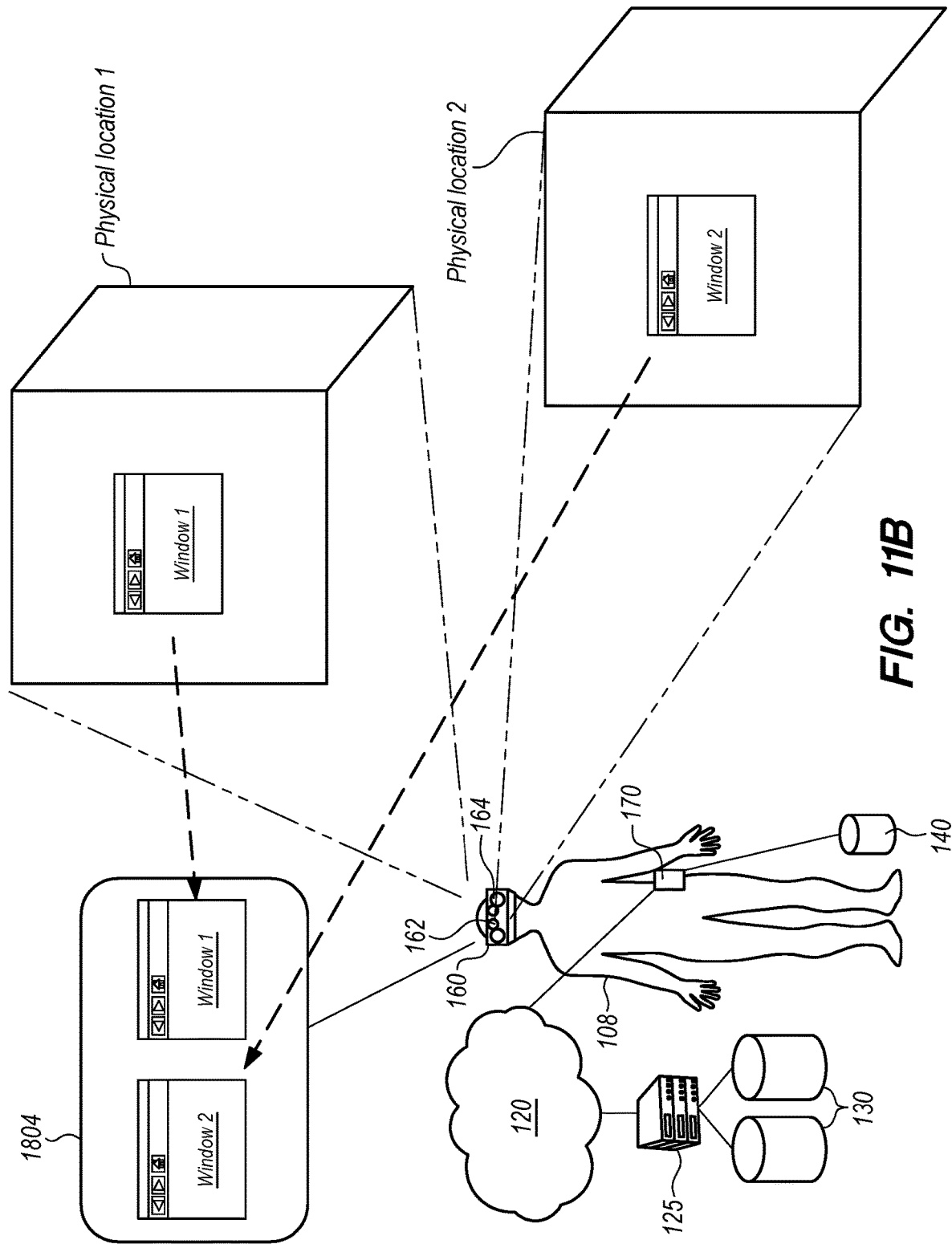

FIGS. 11A-B illustrate this process to display windows for the user regardless of the previous physical location of the windows. In the mixed reality embodiment, windows may be associated with a device and/or with a physical space. Users can place content throughout their home, or at different geographical locations throughout the day. In FIG. 11A, it can be seen that a first browser window 1 has been placed into a first physical location, while a second browser window 2 has been placed into a second physical location. Since the windows are associated with specific physical locations/coordinate space in a mixed reality embodiment, this means that window 1 would normally only be visible when the user 108 is located in physical location 1, but not visible when the user 108 is located in physical location 2. Similarly, window 2 would normally only be visible when the user 108 is located in physical location 2, but not visible when the user 108 is located in physical location 1.

As shown in FIG. 11B, an "All Windows" view 1804 allows the user 108 to view, re-open, and close open windows, regardless of physical location (see earlier paragraphs for examples of "open" windows). Therefore, view 1804 can display a manipulatable version (e.g. visual representation) of both window 1 and window 2, despite the fact that these windows were associated with different physical locations. When accessed from the browser's control hub, View All Windows (or alternatively "All Windows") allows users to see all open windows, regardless of their physical or geographical position. The windows may be in the same room, a different room, or another space entirely. A screenshot, favicon, domain, and/or page title are used to identify (e.g. visually represent) each window. In some embodiments, windows with multiple tabs show stacked previews of the underlying tabs on hover. With the context menu, users can open new instances of a window, close windows, minimize windows, bookmark windows, and add windows to collection—regardless of location.

Global buttons may also be provided that can be used to close or minimize all open windows.

FIGS. 12-13 provide illustrations of possible approaches to display the multiple windows within a mixed realty interface. These figures illustrate example approach(es) to implement an interface where multiple windows are displayed and presented to a user. Any of the browser windows can be selected by a suitable user input device, such as a pointing device, for further viewing by the user. To the extent there are too many windows than can fit onto the interface, in some embodiments, additional windows can be visually "ghosted" (as shown on the right-hand side of FIG. 12 and FIG. 13), with scrolling controls provided to scroll to the additional windows.

Therefore, what has been described is an improved approach to view windows in a mixed reality environment, where a view is provided of a user's windows, regardless of the current location for the user relative to one or more previously-opened windows. This addresses and resolves the situation where, when using mixed reality equipment, a user may want to access one or more browser windows that are associated with one or more different physical locations.

While the embodiments above have been described in terms of a browser application, the scope of the claims also cover any other application or set of applications. In some embodiments, all applications in an operating system can be selected and displayed according to the claims. Such embodiments would have applications in prisms instead of parsed browser content in windows.

Such an embodiment is depicted in FIG. 14, which displays a plurality of applications in a plurality of prisms. The "All" button is an exemplary drop down filter to help sort through the application options for display and selection (e.g., by category). The exemplary slider bar that ranges from 9 m to 30 m selects applications that are included in the all applications/landscape manager display based on a distance from the user, although other suitable selection or filtering methods and/or interfaces may be used. In some embodiments, the user can set the slider bar to a smaller distance corresponding to a room to display all applications available in that room. In some embodiments, the user can set the slider bar to a larger distance corresponding to a house to display all applications available in the whole house. In some embodiments, the slider bar can be set with the far right corresponding to all apps regardless of location. The "Close all" button is an exemplary user interface element for controlling and/or manipulating applications. Other user interface elements may open all, move, etc., as described above. FIG. 14 depicts two different instances of the "HELIO" application and a "COLLECTION" application among the open applications. Accordingly, the "All" button can display multiple instances of an application as well as different applications.

Additional Embodiments

Additional embodiments of the disclosure are described below. These additional embodiments may incorporate elements from the embodiments disclosed above, and elements of these additional embodiments may be incorporated into the embodiments disclosed above.

1. A computer program product embodied on a computer readable medium, the computer readable medium having stored thereon a sequence of instructions which, when executed by a processor causes the processor to execute a method comprising:

receive an instruction to select multiple open windows;
retrieve information for the multiple open windows, where the multiple open windows are associated with different physical locations;
displaying a representation of the multiple open windows in a single user interface; and
upon receiving a selection of a selected window of the multiple open windows, loading the selected window into a foreground of a field of view for a user.

2. The computer program product of embodiment 1, wherein the representation of the multiple open windows is displayed in the single user interface by changing location parameters for multiple open windows to locations within a current physical environment for the user.

3. The computer program product of embodiment 2, wherein the multiple open windows are rendered and displayed to the user at coordinates that are assigned to the multiple open windows within the single user interface.

4. The computer program product of embodiment 3, wherein the multiple open windows are rendered in at least one of preview form, thumbnail form, or full form.

5. The computer program product of embodiment 1, wherein all open windows are selected for display in the single user interface.

6. The computer program product of embodiment 1, wherein each of the multiple open windows are rendered into a bounded volume for placement of virtual content.

7. The computer program product of embodiment 1, wherein a hover state is implemented, where a window being hovered upon moves into a foreground while other windows visually recede.

8. The computer program product of embodiment 1, wherein upon receiving the selection of the selected window, non-selected windows are closed.

9. A method for displaying virtual content in a computing environment, comprising:

receive an instruction to select multiple open applications;
retrieve information for the multiple open applications, where the multiple open applications are associated with different physical locations;
displaying a representation of the multiple open applications in a single user interface; and
upon receiving a selection of a selected application of the multiple open applications, loading the selected application into a foreground of a field of view for a user.

10. The method of embodiment 9, wherein the representation of the multiple open applications is displayed in the single user interface by changing location parameters for multiple open applications to locations within a current physical environment for the user.

11. The method of embodiment 10, wherein the multiple open applications are rendered and displayed to the user at coordinates that are assigned to the multiple open applications within the single user interface.

12. The method of embodiment 11, wherein the multiple open applications are rendered in at least one of preview form, thumbnail form, or full form.

13. The method of embodiment 9, wherein all open applications are selected for display in the single user interface.

14. The method of embodiment 9, wherein each of the multiple open applications are rendered into a separate prism for placement of virtual content.

15. The method of embodiment 9, wherein a hover state is implemented, where an application being hovered upon moves into a foreground while other applications visually recede.

16. The method of embodiment 9, wherein upon receiving the selection of the selected application, non-selected applications are closed.

System Architecture Overview

Figure 15:
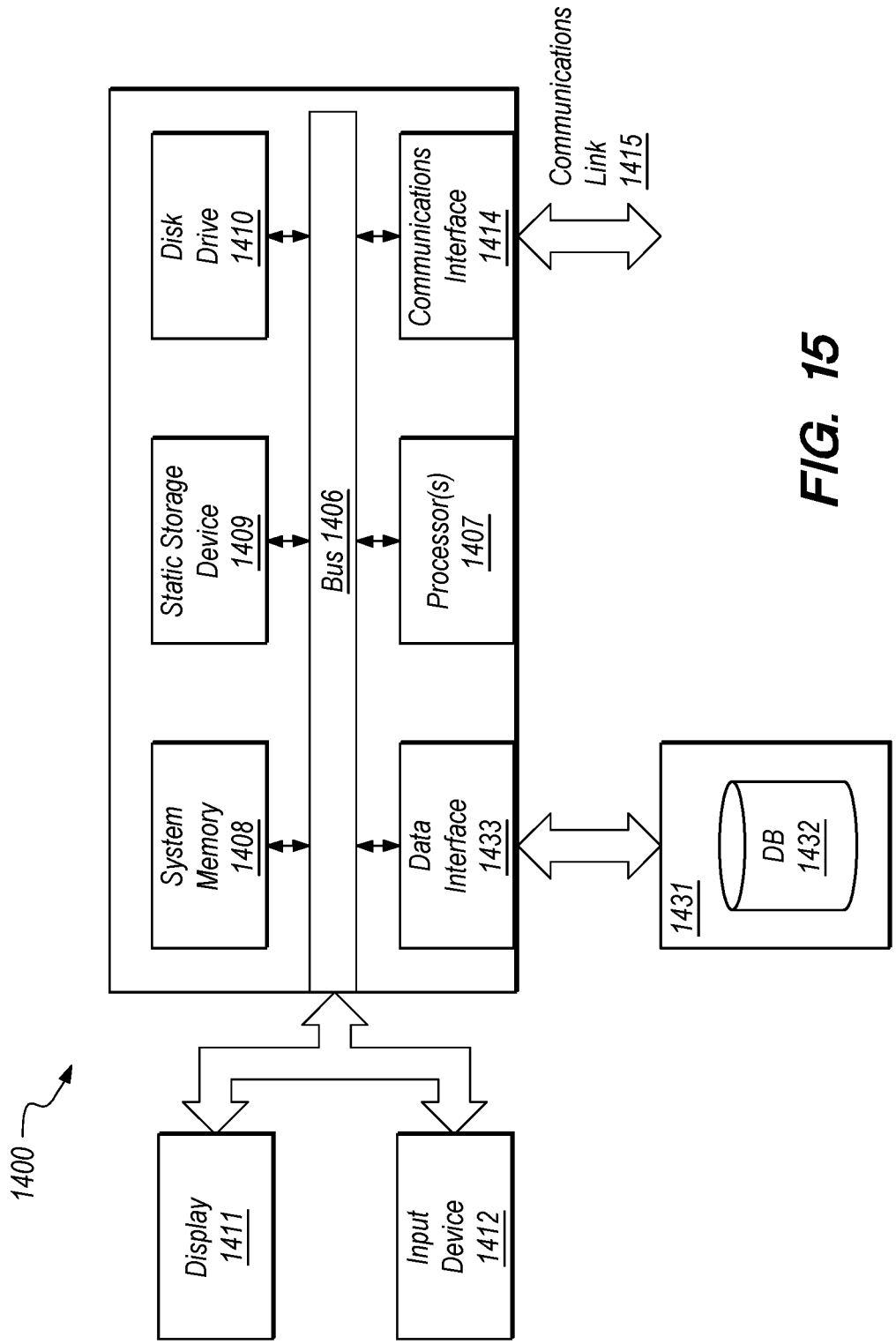
FIG. 15 is a block diagram of an illustrative computing system suitable for implementing an embodiment of the present disclosure.

FIG. 15 is a block diagram of an illustrative computing system 1400 suitable for implementing an embodiment of the present disclosure. The computing system 1400 includes a bus 1406 or other communication mechanism for communicating information, which interconnects subsystems and devices, such as a processor 1407, system memory 1408 (e.g., RAM), a static storage device 1409 (e.g., ROM), a disk drive 1410 (e.g., magnetic or optical), a communications interface 1414 (e.g., modem or Ethernet card), a display 1411 (e.g., CRT or LCD), an input device 1412 (e.g., keyboard and mouse).

According to one embodiment of the invention, the computing system 1400 performs specific operations by the processor 1407 executing one or more sequences of one or more instructions contained in the system memory 1408. Such instructions may be read into the system memory 1408 from another computer readable/usable medium, such as the static storage device 1409 or the disk drive 1410. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to the processor 1407 for execution. Such a medium may take many forms, including but not limited to, non-volatile media and volatile media. Non-volatile media includes, for example, optical or magnetic disks, such as the disk drive 1410. Volatile media includes dynamic memory, such as the system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computing system 1400. According to other embodiments of the disclosure, two or more computing systems 1400 coupled by a communications link 1415 (e.g., LAN, PTSN, or wireless network) may perform the sequence of instructions required to practice the disclosure in coordination with one another.

The computing system 1400 may transmit and receive messages, data, and instructions, including program (i.e., application code) through the communications link 1415 and the communications interface 1414. Received program code may be executed by the processor 1407 as it is received, and/or stored in the disk drive 1410, or other non-volatile storage for later execution. The computing system 1400 may communicate through a data interface 1433 to a database 1432 on an external storage device 1431.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A method for displaying windows in a computing environment, comprising:
receiving, at a mixed reality device, an instruction from a single user interface to select multiple open windows that comprise a first open window and a second open window, wherein
the first open window is rendered into a first bounded volume and comprises a first space for placement of first virtual contents, and
the second open window is rendered into a second bounded volume and comprises a second space for placement of second virtual contents;
retrieving information for the first and the second open windows, wherein the first and the second open windows are respectively rendered at and associated with a first physical location and a second physical location in a physical environment in which a user of the mixed reality device is located at a user location;
presenting, to the user at the user location, a view of both the first virtual contents of the first open window rendered at the first physical location and the second virtual contents of the second open widow rendered at the second physical location in the single user interface, wherein
the first open window rendered at the first physical location is visible within a field of view of the user at the user location, and
the second open window rendered at the second physical location is invisible within the field of view of the user at the user location; and
upon receiving a selection, from the view in the single user interface, of the second open window, loading the second virtual contents placed in the second open window into the field of view of the user at least by placing the second virtual contents in the second bounded volume into the field of view for the user at the user location.

2. The method of claim 1, wherein the view of the first and the second open windows is displayed in the single user interface at least by associating a respective location parameter that was associated with a corresponding location of an open window of the first open window or the second open window with a separate location within the physical environment in which the user is located.

3. The method of claim 2, wherein the multiple open windows are rendered to the user at respective coordinates that are respectively assigned to the multiple open windows within the single user interface, and the view of the multiple open windows is rendered in at least one of a preview form, a thumbnail form, or a full form.

4. The method of claim 1, further comprising:
identifying multiple webpages or respective links to the multiple webpages for a browser application, wherein the respective links include a bookmark of a webpage, and the multiple webpages comprise a first webpage, a second webpage, and a third webpage;

creating, in the single user interface, a multi-stack virtual object having a first virtual tab and a second virtual tab;

creating a first virtual tab for the multi-stack virtual object at least by associating a first portion of the first webpage with the first virtual tab of the multi-stack virtual object; and creating a second virtual tab for the multi-stack virtual object at least by associating a second portion of the first webpage with the second virtual tab of the multi-stack virtual object.

5. The method of claim 4, further comprising:

creating a third virtual tab for the multi-stack virtual object at least by associating the second webpage with the third virtual tab of the multi-stack virtual object; and creating a fourth virtual tab for the multi-stack virtual object at least by associating the third webpage with the fourth virtual tab of the multi-stack virtual object, wherein the multi-stack virtual object automatically advances to a specific tab to display corresponding virtual content associated with the specific tab when the user focuses on the specific tab.

6. The method of claim 1, wherein respective contents of the first and the second open windows are respectively rendered into the first bounded volume and the second bounded volume, rather than into a browser, for respective placement of virtual content, the first or the second bounded volume comprises a three-dimensional volume having a prescribed boundary and managed by an application executing on the mixed-reality device, and loading the second virtual contents in the second open window into the field of view comprises identifying a bounded volume that is selectable from within the field of view, wherein the prism is identified by duplicating the second prism with new associated location information in the field of view or by moving an existing bounded volume selectable from within the field of view based at least in part upon the new associated location information.

7. The method of claim 1, presenting the view comprising displaying, in the view, a plurality of views that are stacked and respectively correspond to multiple tabs of the second open window, wherein a hover state is implemented, a window being hovered upon moves into the foreground within the field of view of the user while one or more other windows visually recede or are closed, and the second open window comprises the multiple tabs having one active tab that is displayed in the second open window.

8. The method of claim 1, loading the second virtual contents in the second open window comprising:

deconstructing two-dimensional (2D) content rendered in the second open window into a specific bounded volume within the field of view, the specific bounded volume comprising one or more first virtual objects, deconstructing the two-dimensional content comprising:

identifying one or more real or virtual objects presented in the field of view;

mapping the one or more first virtual objects to the one or more real or virtual objects in the field of view; and rendering the one or more first virtual objects respectively on the one or more real or virtual objects to complete loading the second virtual contents in the second open window into the field of view.

9. The method of claim 1, further comprising:

implementing viewing of the view of multiple open windows comprising the first and the second open windows in the single user interface based at least in part upon a user interaction between the user and the mixed reality device via at least a portion of the single user interface, regardless of a current location of the user in the physical environment relative to respective physical locations of the multiple open windows in the physical environment, wherein the multiple open windows comprise the first and the second open windows.

10. A system for manipulating a window in a computing environment, comprising:

a mixed realty display device that displays three-dimensional content;

a processor;

a memory for holding programmable code executable by the processor, wherein the programmable code includes instructions which, when executed by the processor, cause the processor to:

receive, at the mix reality display device, an instruction from a single user interface to select multiple open windows that comprise a first open window and a second open window, wherein the first open window is rendered into a first bounded volume and comprises a first space for placement of first virtual contents, and the second open window is rendered into a second bounded volume and comprises a second space for placement of second virtual contents;

retrieve information for the first and the second open windows, wherein the first and the second open windows are respectively rendered at and associated with a first physical location and a second physical location in a physical environment in which a user of the mixed reality device is located at a user location;

present, to the user at the user location, a view of both the first open window rendered at the first physical location and the second open window at the second physical location in the single user interface presented by the mixed reality display device, wherein the first open window rendered at the first physical location is visible within a field of view of the user at the user location, and the second open window rendered at the second physical location is invisible within the field of view of the user at the user location; and upon receiving a selection of the second open window in the single user interface, load the second virtual contents rendered in the second open window into the field of view of the user at least by placing the second virtual contents in the second bounded volume into the field of view for the user at the user location.

11. The system of claim 10, wherein the view of the first and the second open windows is displayed in the single user interface at least by associating a respective location parameter that was associated with a corresponding location of an open window of the first open window or the second open window with a separate location within the physical environment in which the user is located.

12. The system of claim 11, wherein the multiple open windows are rendered and displayed to the user at coordinates that are respectively assigned to the multiple open windows within the single user interface, and the view of the multiple open windows is rendered in at least one of a preview form, a thumbnail form, or a full form.

13. The system of claim 12, wherein the programmable code further includes the instructions which, when executed by the processor, further cause the processor to:
  identify multiple webpages or respective links to the multiple webpages for a browser application, wherein the respective links include a bookmark of a webpage, and the multiple webpages comprise a first webpage, a second webpage, and a third webpage;
  create, in the single user interface, a multi-stack virtual object having a first virtual tab and a second virtual tab;
  create a first virtual tab for the multi-stack virtual object at least by associating a first portion of the first webpage with the first virtual tab of the multi-stack virtual object; and
  create a second virtual tab for the multi-stack virtual object at least by associating a second portion of the first webpage with the second virtual tab of the multi-stack virtual object.

14. The system of claim 13, wherein the programmable code further includes the instructions which, when executed by the processor, further cause the processor to:
  creating a third virtual tab for the multi-stack virtual object at least by associating the second webpage with the third virtual tab of the multi-stack virtual object; and
  creating a fourth virtual tab for the multi-stack virtual object at least by associating the third webpage with the fourth virtual tab of the multi-stack virtual object, wherein the multi-stack virtual object automatically advances to a specific tab to display corresponding virtual content associated with the specific tab when the user focuses on the specific tab.

15. The system of claim 10, wherein respective contents of the first and the second open windows are respectively rendered into the first bounded volume and the second bounded volume, rather than into a browser, for respective placement of virtual content, the first or the second bounded volume comprises a three-dimensional volume having a prescribed boundary and managed by an application executing on the mixed-reality device, and loading the second virtual contents in the second open window into the field of view comprises identifying a bounded volume that is selectable from within the field of view, wherein the bounded volume is identified by duplicating the second bounded volume with new associated location information in the field of view or by moving an existing bounded volume selectable from within the field of view based at least in part upon the new associated location information.

16. The system of claim 10, the instructions which, when executed by the processor, further cause the processor to display, in the view, a plurality of views that are stacked and respectively correspond to multiple tabs of the second open window, wherein a hover state is implemented, where a window being hovered upon moves into a foreground within the field of view of the user while one or more other windows visually recede or are closed, and the second open window comprises the multiple tabs having one active tab that is displayed in the second open window.

17. The system of claim 10, wherein the programmable code whose execution causes the processor to load the virtual contents further includes the instructions which, when executed by the processor, further cause the processor to:
  deconstruct two-dimensional (2D) content rendered in the second open window into a specific bounded volume within the field of view, the bounded volume comprising one or more virtual objects at least by:
    identifying one or more real or virtual objects presented in the field of view;
    mapping the one or more virtual objects to the one or more real or virtual objects in the field of view; and
    rendering the one or more virtual objects respectively on the one or more real or virtual objects to complete loading the second virtual contents in the second open window into the field of view.

18. A computer program product embodied on a non-transitory computer readable medium having stored thereon a sequence of instructions which, when executed by a processor, causes the processor to execute a set of acts that comprises:
  receiving, at a mixed reality device, an instruction from a single user interface to select multiple open windows that comprise a first open window and a second open window, wherein
    the first open window is rendered into a first bounded volume and comprises a first space for placement of first virtual contents, and
    the second open window is rendered into a second bounded volume and comprises a second space for placement of second virtual contents;
  retrieving information for the multiple open windows, wherein
    the first and the second open windows are respectively rendered at and associated with a first physical location and a second physical location in a physical environment in which a user of the mixed reality device is located at a user location;
  presenting, to the user at the user location, a view of both the first open window rendered at the first physical location and the second open window rendered at the second physical location in the single user interface presented to the user by the mixed reality device, wherein
    the first open window rendered at the first physical location is visible within a field of view the user at the user location, and
    the second open window rendered at the second physical location is invisible within the field of view of the user at the user location; and
  upon receiving a selection of the second open window in the single user interface, loading the second virtual contents placed in the second open window into the field of view of the user at least by placing the second virtual contents in the second bounded volume into the field of view for the user at the user location.

19. The computer program product of claim 18, the set of acts further comprising:
  identifying multiple webpages or respective links to the multiple webpages for a browser application, wherein the respective links include a bookmark of a webpage, and the multiple webpages comprise a first webpage, a second webpage, and a third webpage;
  creating, in the single user interface, a multi-stack virtual object having a first virtual tab and a second virtual tab;
  creating a first virtual tab for the multi-stack virtual object at least by associating a first portion of the first webpage with the first virtual tab of the multi-stack virtual object;
  creating a second virtual tab for the multi-stack virtual object at least by associating a second portion of the first webpage with the second virtual tab of the multi-stack virtual object;

creating a third virtual tab for the multi-stack virtual object at least by associating the second webpage with the third virtual tab of the multi-stack virtual object; and creating a fourth virtual tab for the multi-stack virtual object at least by associating the third webpage with the fourth virtual tab of the multi-stack virtual object, wherein the multi-stack virtual object automatically advances to a specific tab to display corresponding virtual content associated with the specific tab when the user focuses on the specific tab.

20. A method for displaying virtual content in a computing environment, comprising:

receiving, at a mixed reality device, an instruction from a single user interface to select multiple open applications that comprise a first open application and a second open application, wherein the first open application is rendered into a first bounded volume for placement of first contents, and the second open application is rendered into a second bounded volume for placement of first contents;

retrieving information for the first and the second open applications, wherein the first and the second open applications are respectively associated with a first physical location and a second physical location in a physical environment in which a user of the mixed reality device is located at a user location;

presenting, to the user, a view of both the first contents of the first open application the first and the second contents of the second open applications in the single user interface, wherein the first open application in the first bounded volume and associated with the first physical location is visible within a field of view of the user at the user location, and the second open application in the second bounded volume and associated with the second physical location is invisible within the field of view of the user at the user location; and upon receiving a selection, from the view in the single user interface, of the second open application that is invisible within the field of view of the user, loading the second contents of the second open application into the field of view of the user at the user location at least by placing the second contents in the second bounded volume into the field of the user at the user location.

21. The method of claim 18, further comprising:

identifying multiple webpages or respective links to the multiple webpages for the first or the second open application, wherein the respective links include a bookmark of a webpage, and the multiple webpages comprise a first webpage, a second webpage, and a third webpage;

creating, in the single user interface, a multi-stack virtual object having a first virtual tab and a second virtual tab;

creating a first virtual tab for the multi-stack virtual object at least by associating a first portion of the first webpage with the first virtual tab of the multi-stack virtual object;

creating a second virtual tab for the multi-stack virtual object at least by associating a second portion of the first webpage with the second virtual tab of the multi-stack virtual object;

creating a third virtual tab for the multi-stack virtual object at least by associating the second webpage with the third virtual tab of the multi-stack virtual object; and creating a fourth virtual tab for the multi-stack virtual object at least by associating the third webpage with the fourth virtual tab of the multi-stack virtual object, wherein the multi-stack virtual object automatically advances to a specific tab to display corresponding virtual content associated with the specific tab when the user focuses on the specific tab.

* * * * *